(12) United States Patent
Lee et al.

(10) Patent No.: US 10,318,007 B2
(45) Date of Patent: Jun. 11, 2019

(54) HEAD MOUNTED DISPLAY DEVICE FOR MULTI-TASKING AND METHOD FOR CONTROLLING SAME

(71) Applicant: LG ELECTRONICS INC., Seoul (KR)

(72) Inventors: Sangyun Lee, Seoul (KR); Sunghwan Jeon, Seoul (KR); Seehwan Yoo, Seoul (KR); Dojung Kim, Seoul (KR); Haejin Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 151 days.

(21) Appl. No.: 15/110,052

(22) PCT Filed: Jan. 27, 2014

(86) PCT No.: PCT/KR2014/000751
§ 371 (c)(1),
(2) Date: Jul. 6, 2016

(87) PCT Pub. No.: WO2015/111778
PCT Pub. Date: Jul. 30, 2015

(65) Prior Publication Data
US 2016/0328021 A1    Nov. 10, 2016

(51) Int. Cl.
*G06F 3/01*    (2006.01)
*G06F 3/03*    (2006.01)
(Continued)

(52) U.S. Cl.
CPC .......... *G06F 3/017* (2013.01); *G02B 27/017* (2013.01); *G06F 3/011* (2013.01); *G06F 3/0304* (2013.01);
(Continued)

(58) Field of Classification Search
None
See application file for complete search history.

(56) References Cited

U.S. PATENT DOCUMENTS

| | | | |
|---|---|---|---|
| 8,836,768 B1 * | 9/2014 | Rafii | G06F 3/017 345/420 |
| 2010/0085384 A1 * | 4/2010 | Kim | G06F 3/0488 345/660 |

(Continued)

FOREIGN PATENT DOCUMENTS

| | | |
|---|---|---|
| JP | 2009-037434 A | 2/2009 |
| JP | 2011-081469 A | 4/2011 |

(Continued)

*Primary Examiner* — David D Davis
(74) *Attorney, Agent, or Firm* — Birch, Stewart, Kolasch & Birch, LLP

(57) ABSTRACT

A head mounted display device can include a display unit configured to output an image; a sensing unit configured to sense a first gesture input based on an image acquired through a camera; and a controller configured to recognize an external terminal corresponding to the first gesture input, execute a first function associated with the first gesture input while the first gesture input is sensed, sense, via the sensing unit, a second gesture input while the first function is being executed, maintain the execution of the first function while the first gesture input and second gesture input are no longer sensed, sense, via the sensing unit, a third gesture input, and in response to sensing the third gesture input, execute a second function together with the first function while the third gesture is sensed.

9 Claims, 34 Drawing Sheets

(51) Int. Cl.
*G06F 3/14* (2006.01)
*G09G 3/00* (2006.01)
*G02B 27/01* (2006.01)
*G06T 11/00* (2006.01)
*G06T 19/00* (2011.01)
*G06F 3/0481* (2013.01)
*G06F 3/0482* (2013.01)

(52) U.S. Cl.
CPC ........ *G06F 3/0482* (2013.01); *G06F 3/04815* (2013.01); *G06F 3/14* (2013.01); *G06T 11/00* (2013.01); *G06T 19/006* (2013.01); *G02B 2027/014* (2013.01); *G02B 2027/0178* (2013.01); *G02B 2027/0187* (2013.01); *G06F 3/1454* (2013.01); *G09G 3/003* (2013.01)

(56) References Cited

U.S. PATENT DOCUMENTS

| | | | |
|---|---|---|---|
| 2011/0083112 A1 | 4/2011 | Matsubara et al. | |
| 2011/0249107 A1 | 10/2011 | Chiu | |
| 2012/0062558 A1* | 3/2012 | Lee | G06F 3/017 |
| | | | 345/419 |
| 2012/0302289 A1* | 11/2012 | Kang | G06F 3/011 |
| | | | 455/557 |
| 2013/0024805 A1* | 1/2013 | In | G11B 27/34 |
| | | | 715/781 |

FOREIGN PATENT DOCUMENTS

| | | |
|---|---|---|
| JP | 2012-181809 A | 9/2012 |
| KR | 10-2013-0067856 A | 6/2013 |

\* cited by examiner

FIG. 5
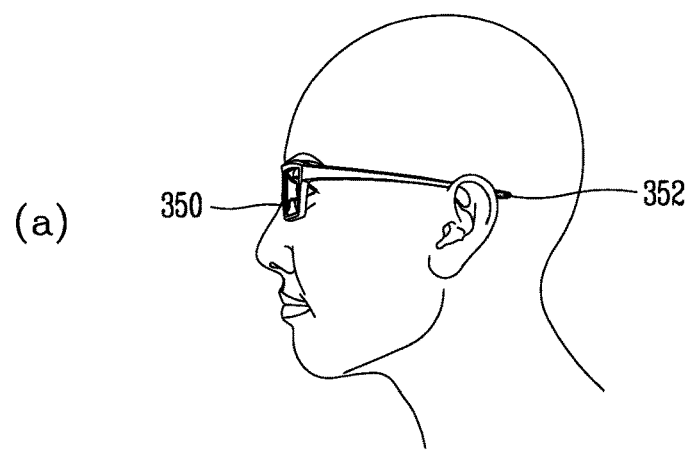
(a)
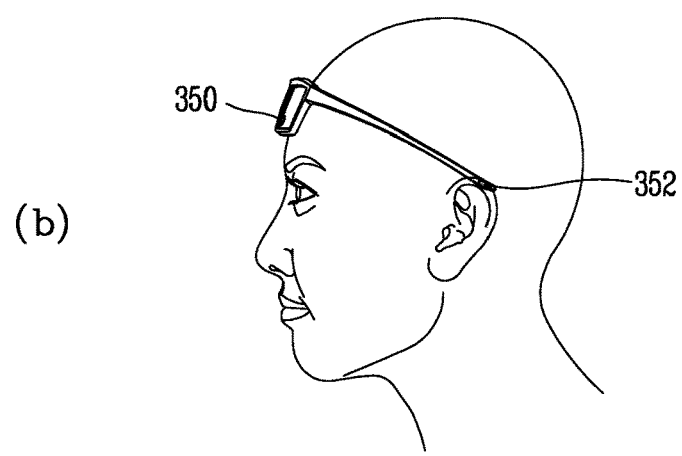
(b)
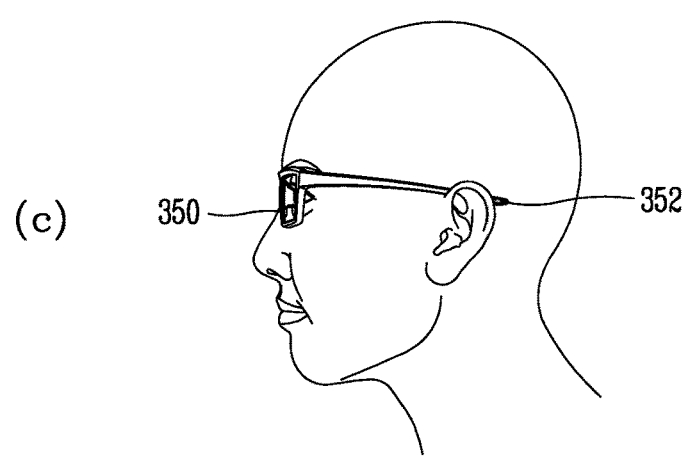
(c)

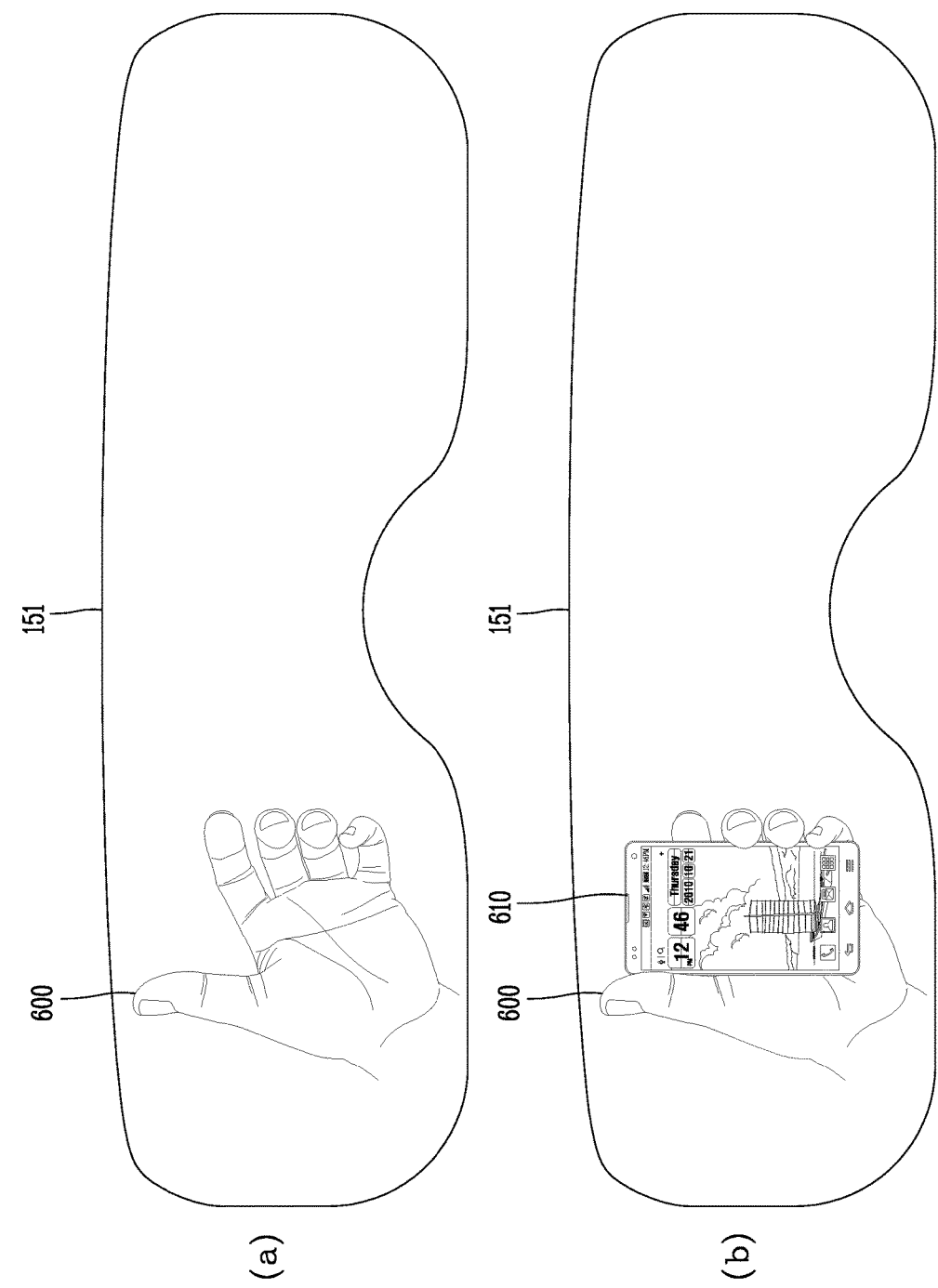

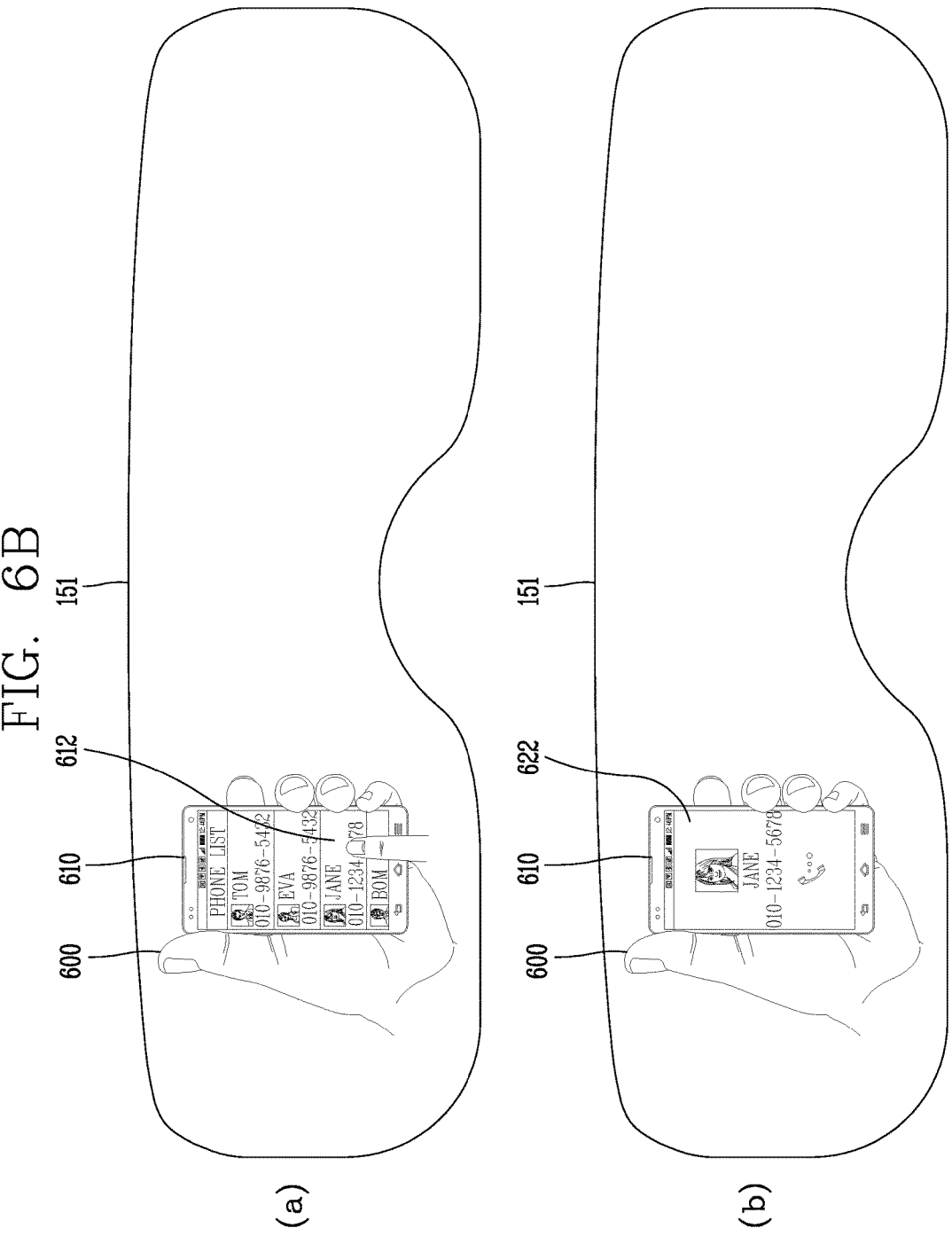

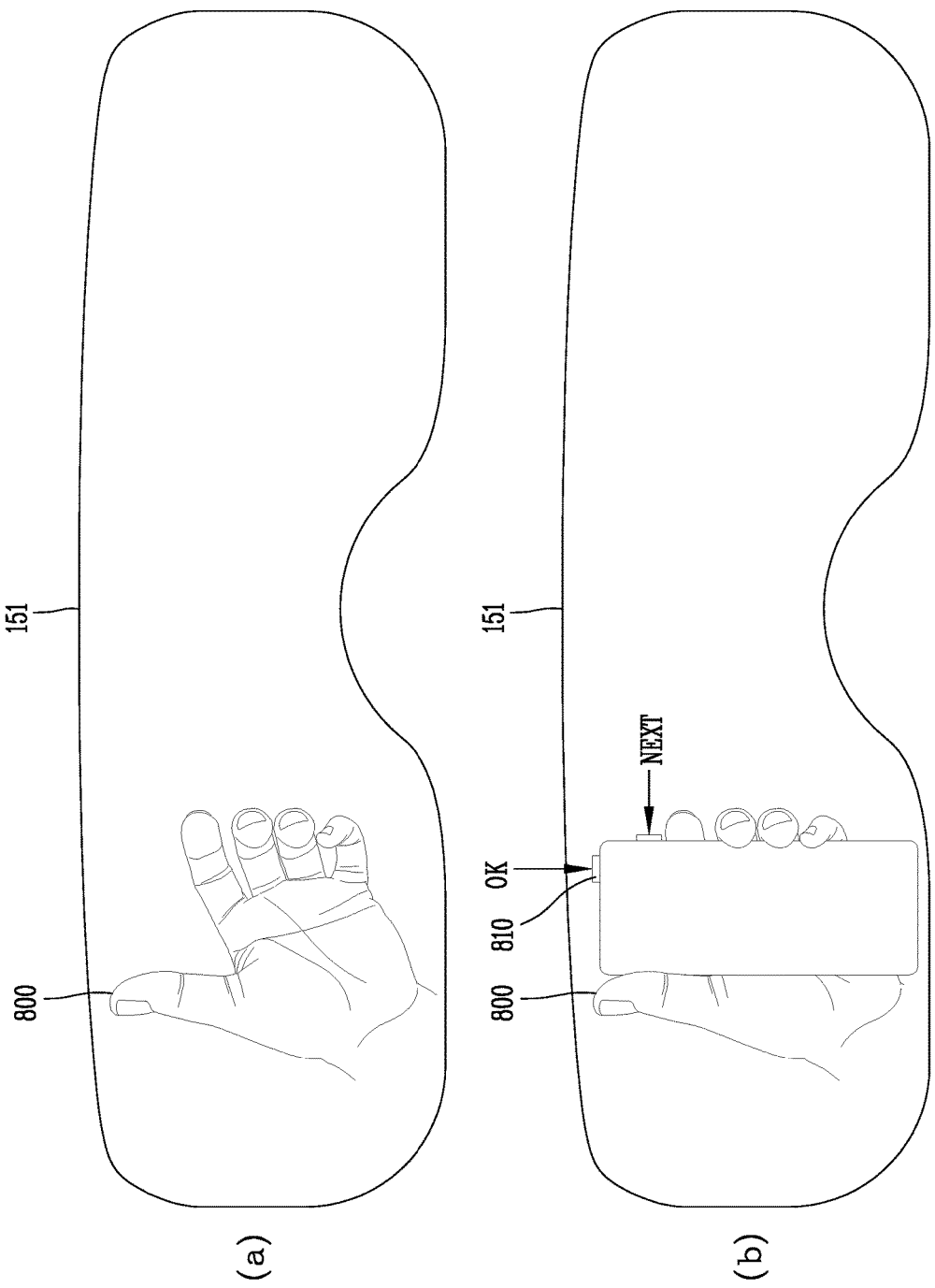

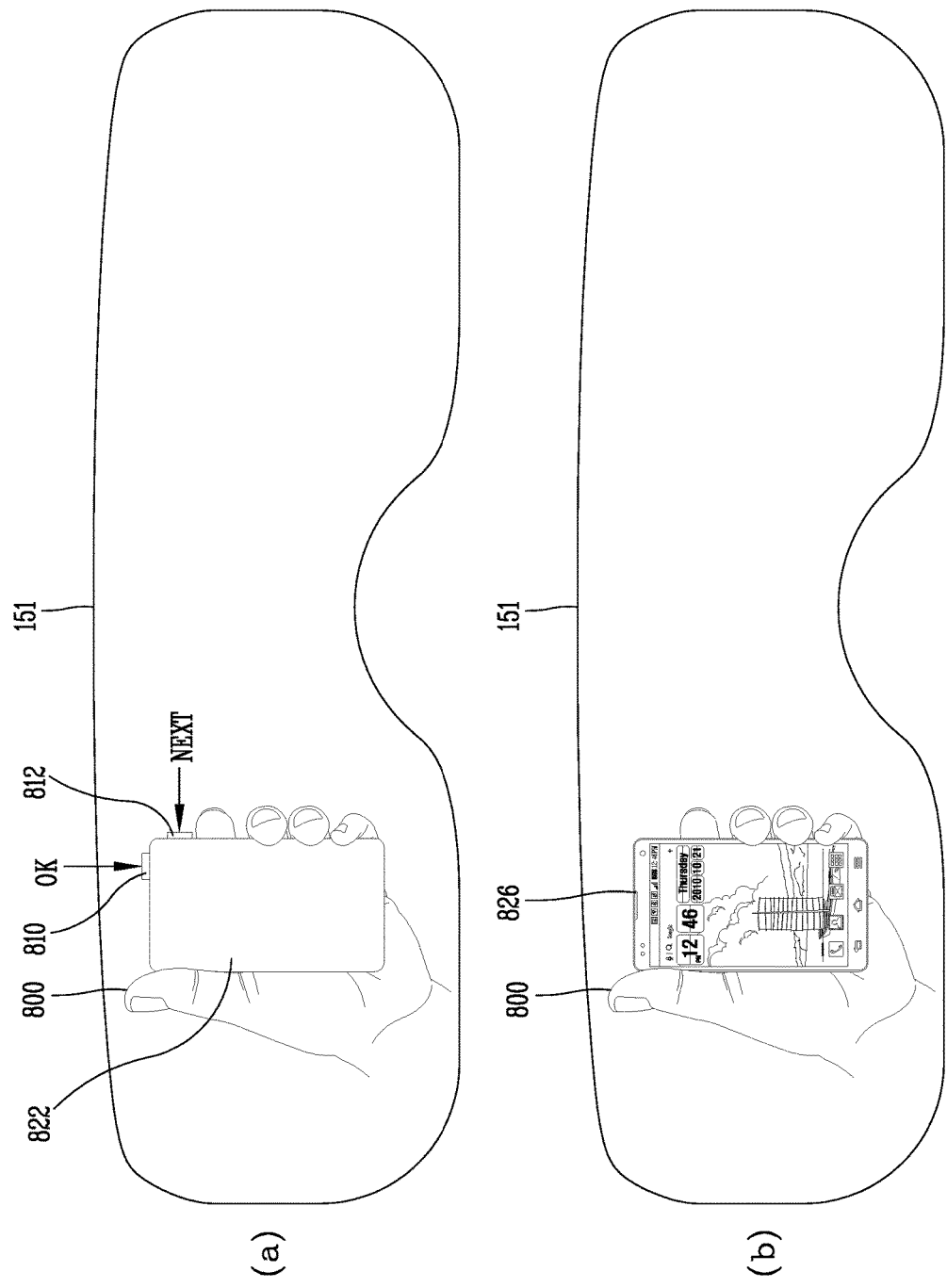

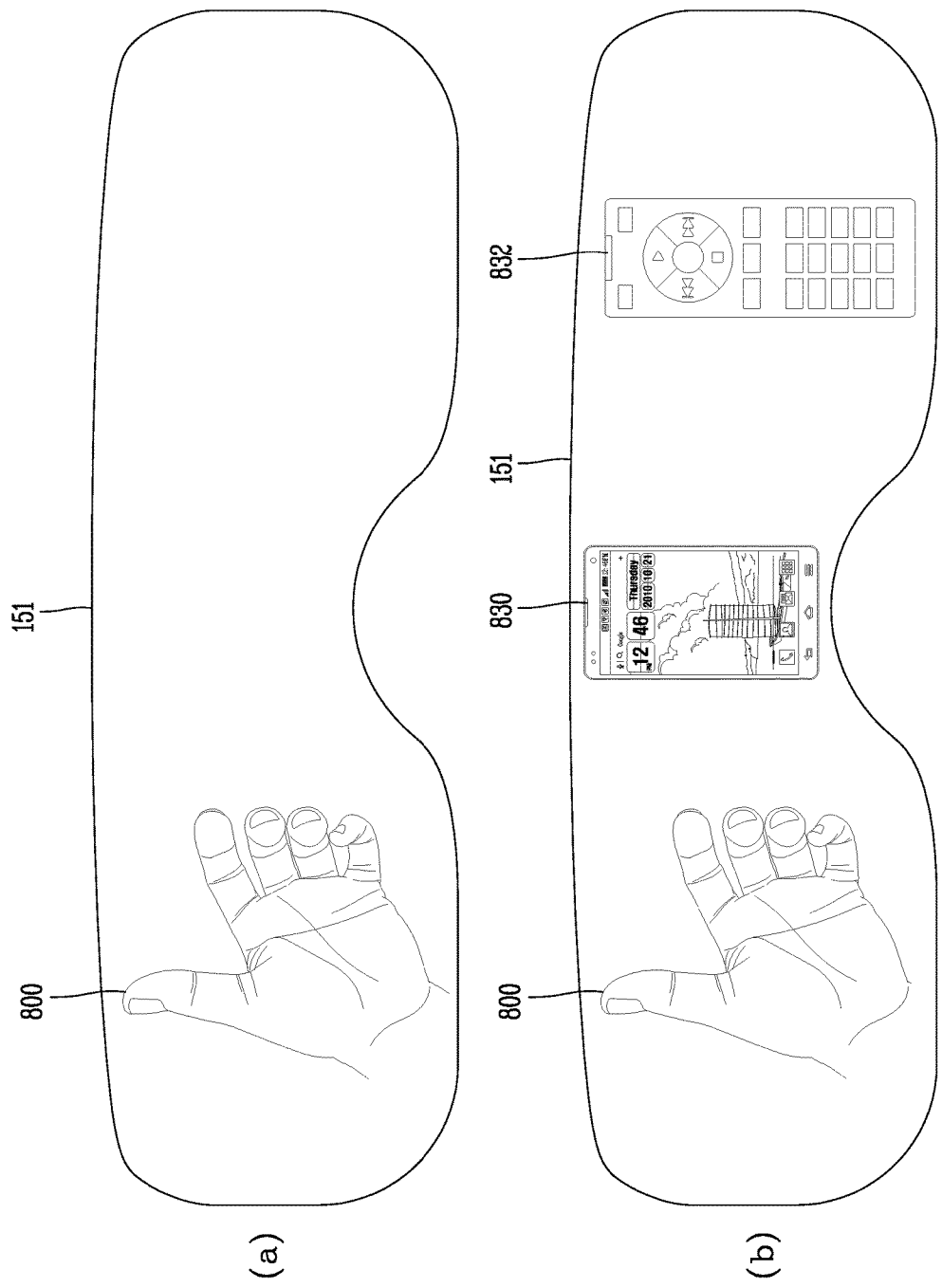

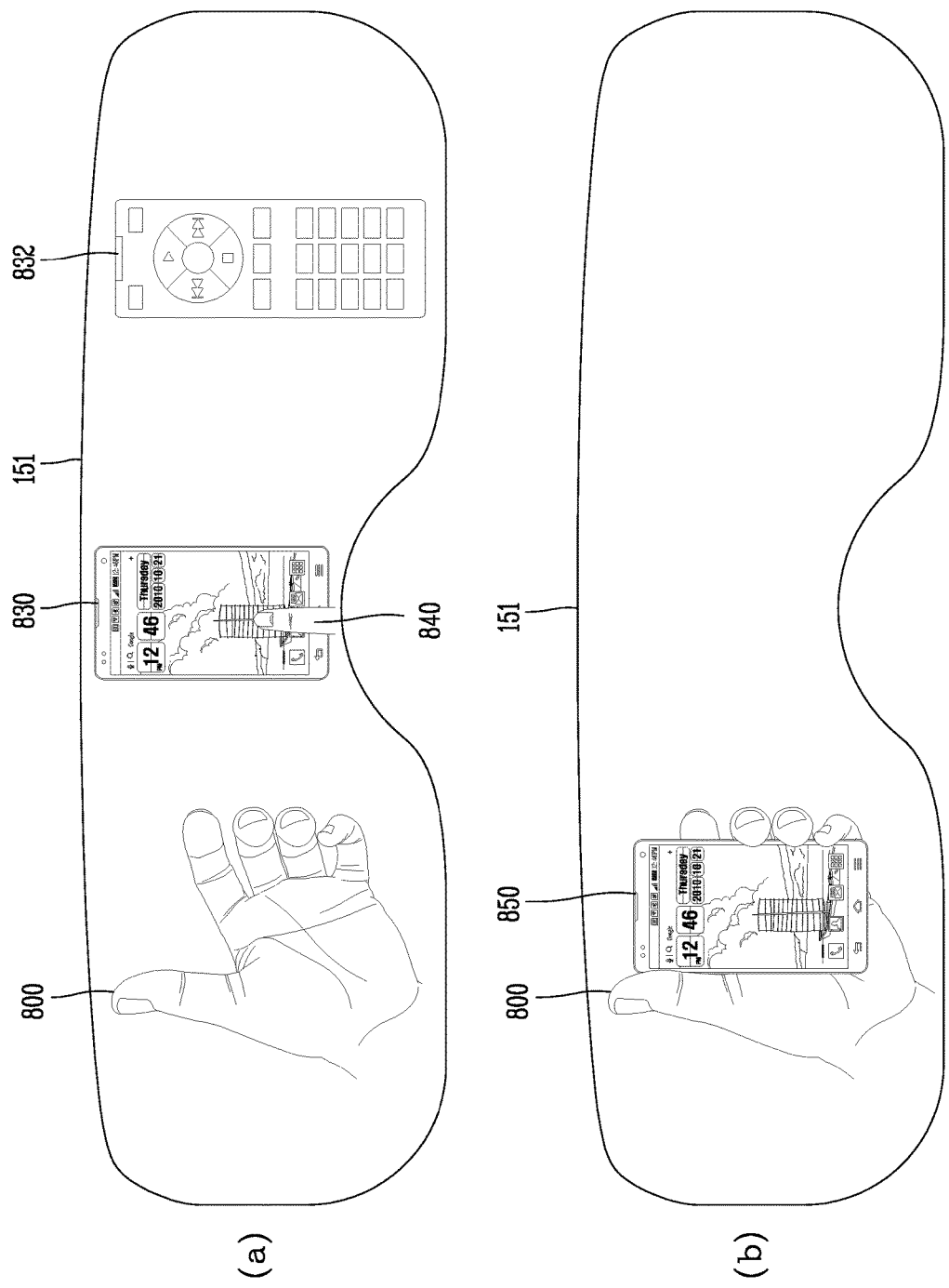

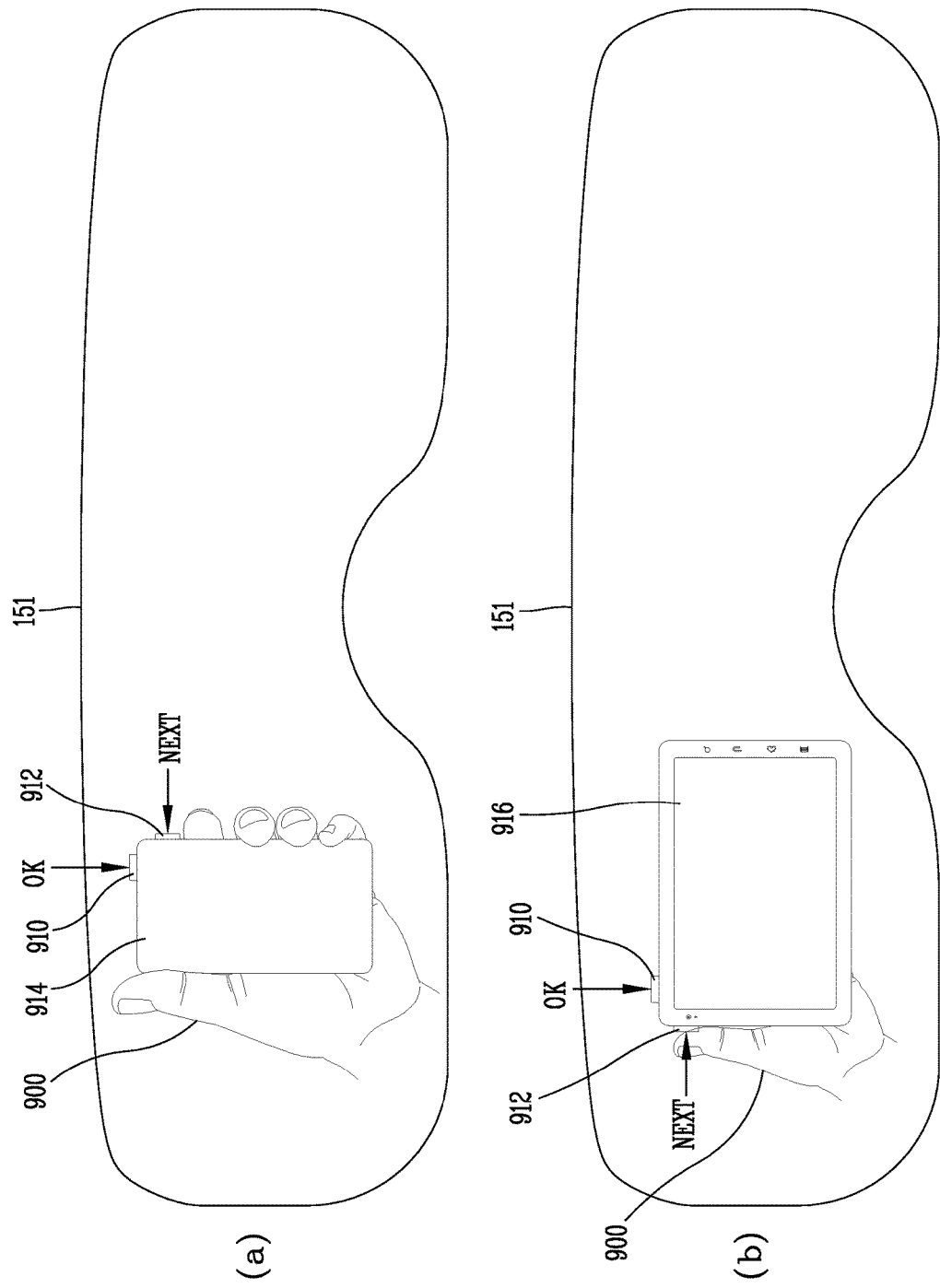

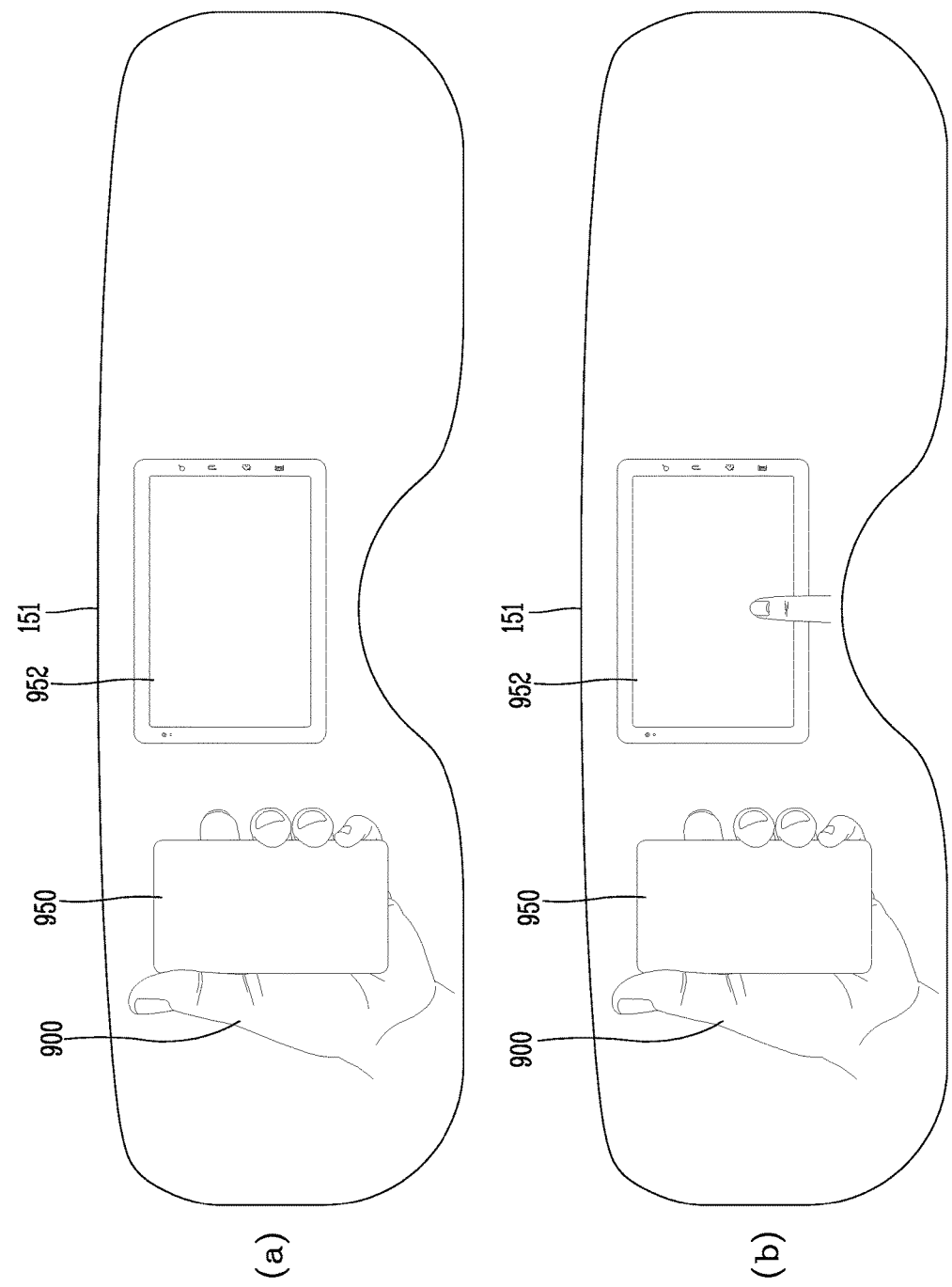

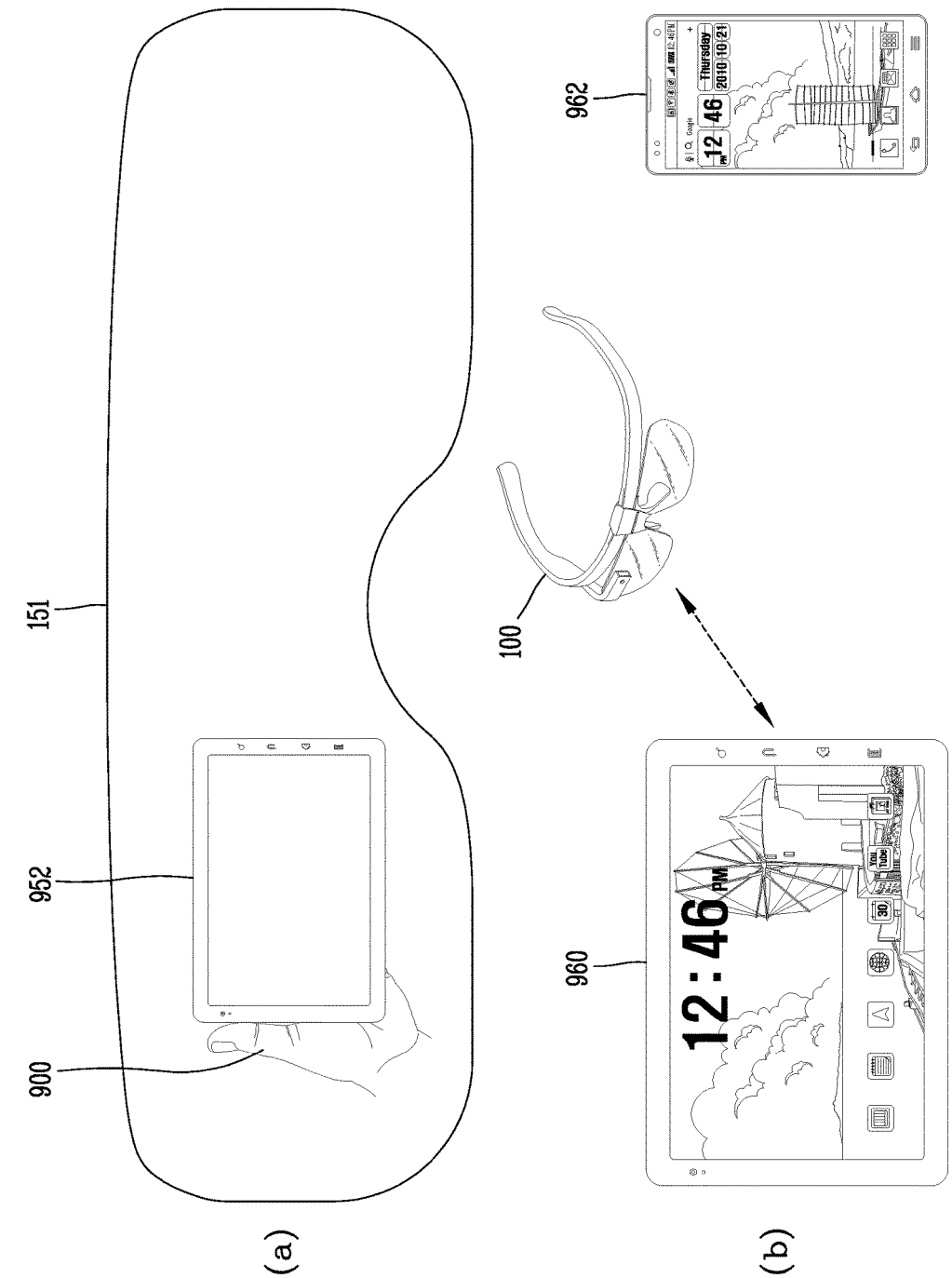

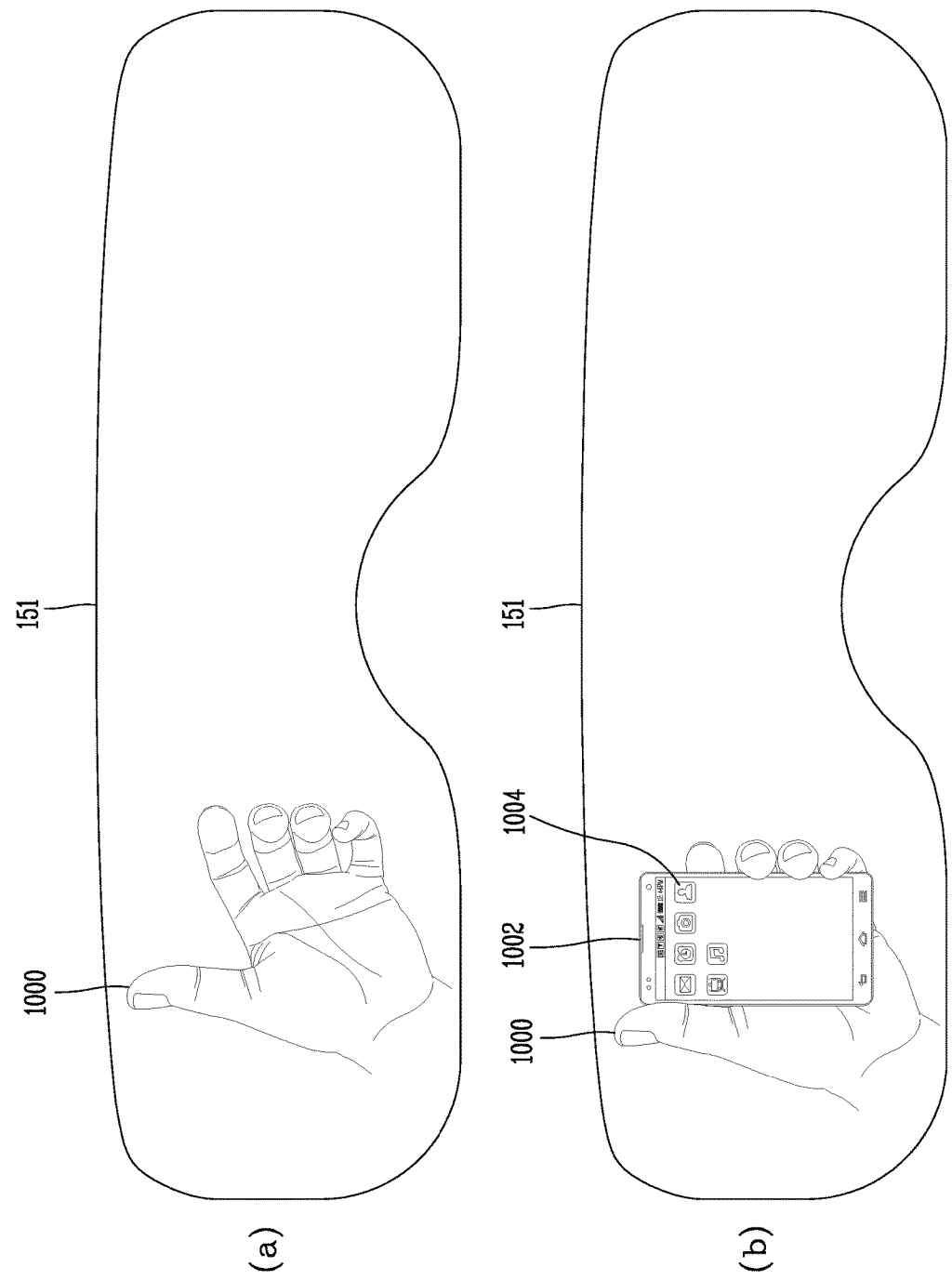

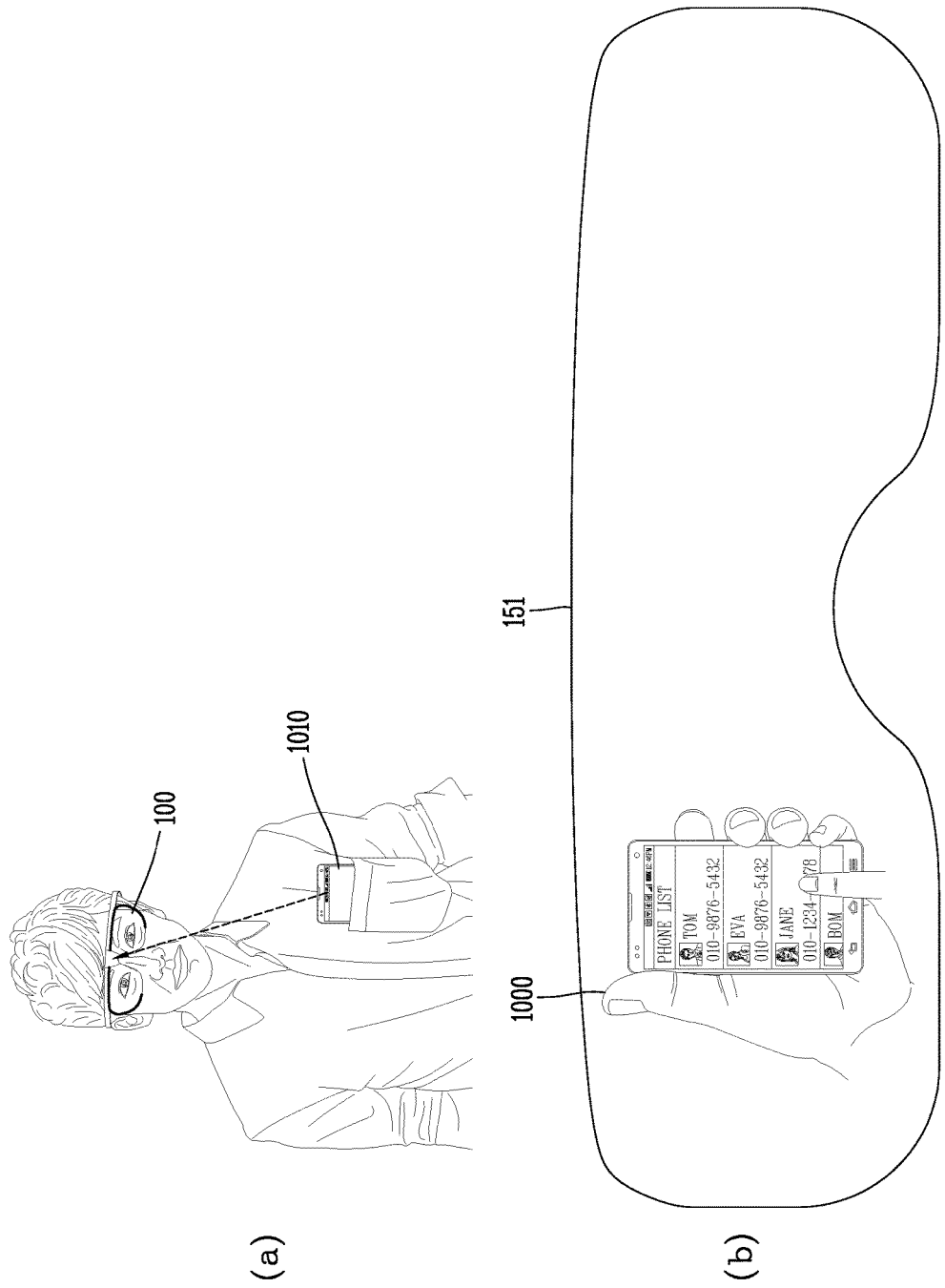

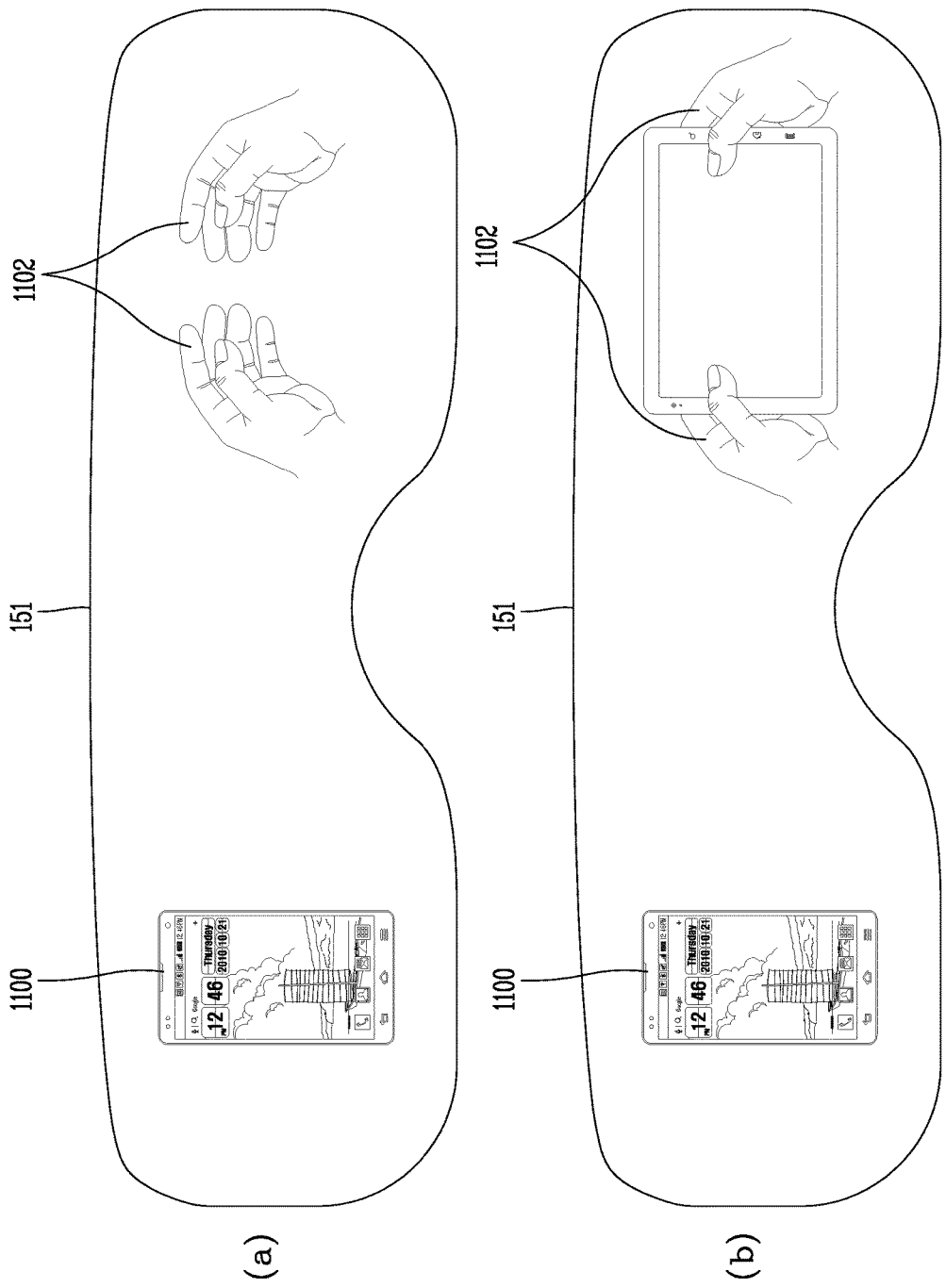

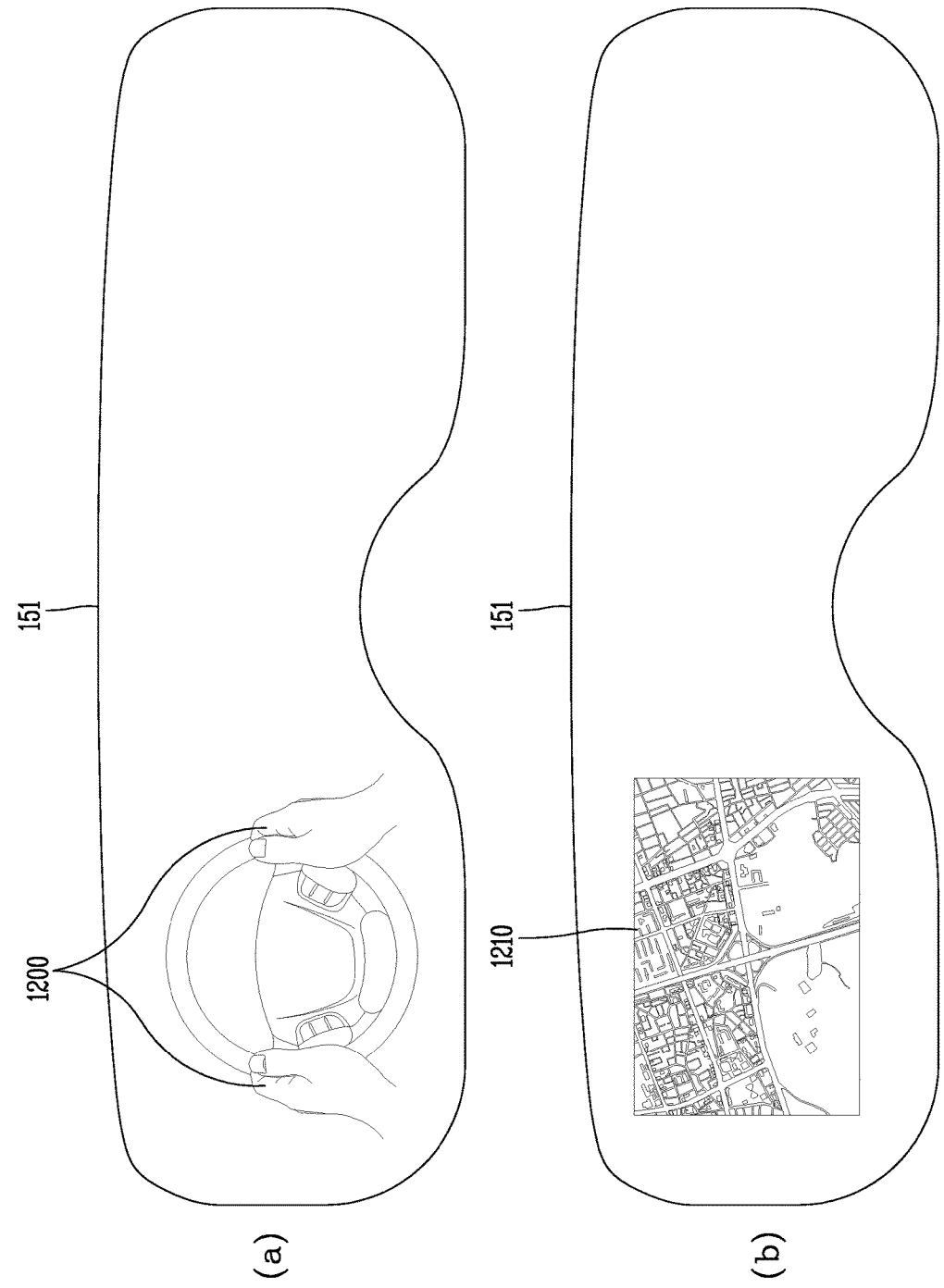

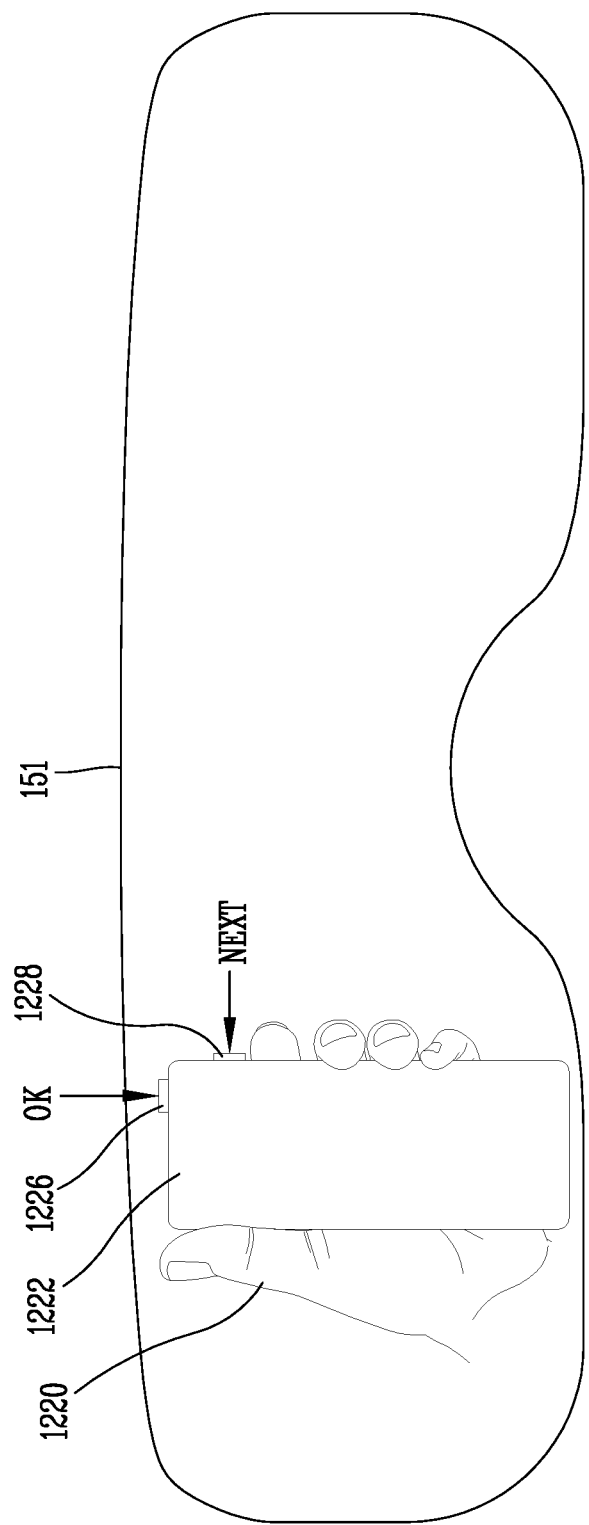

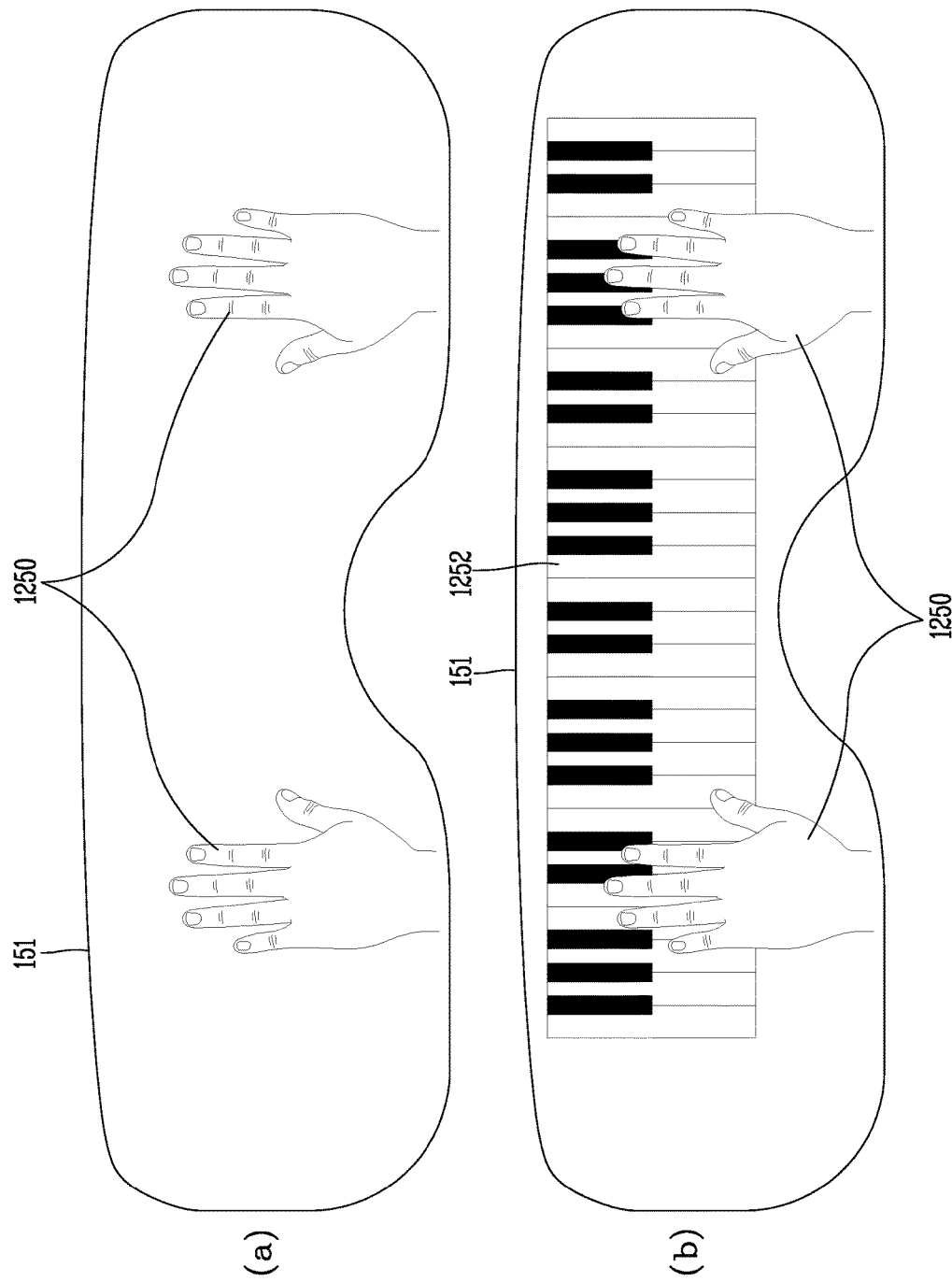

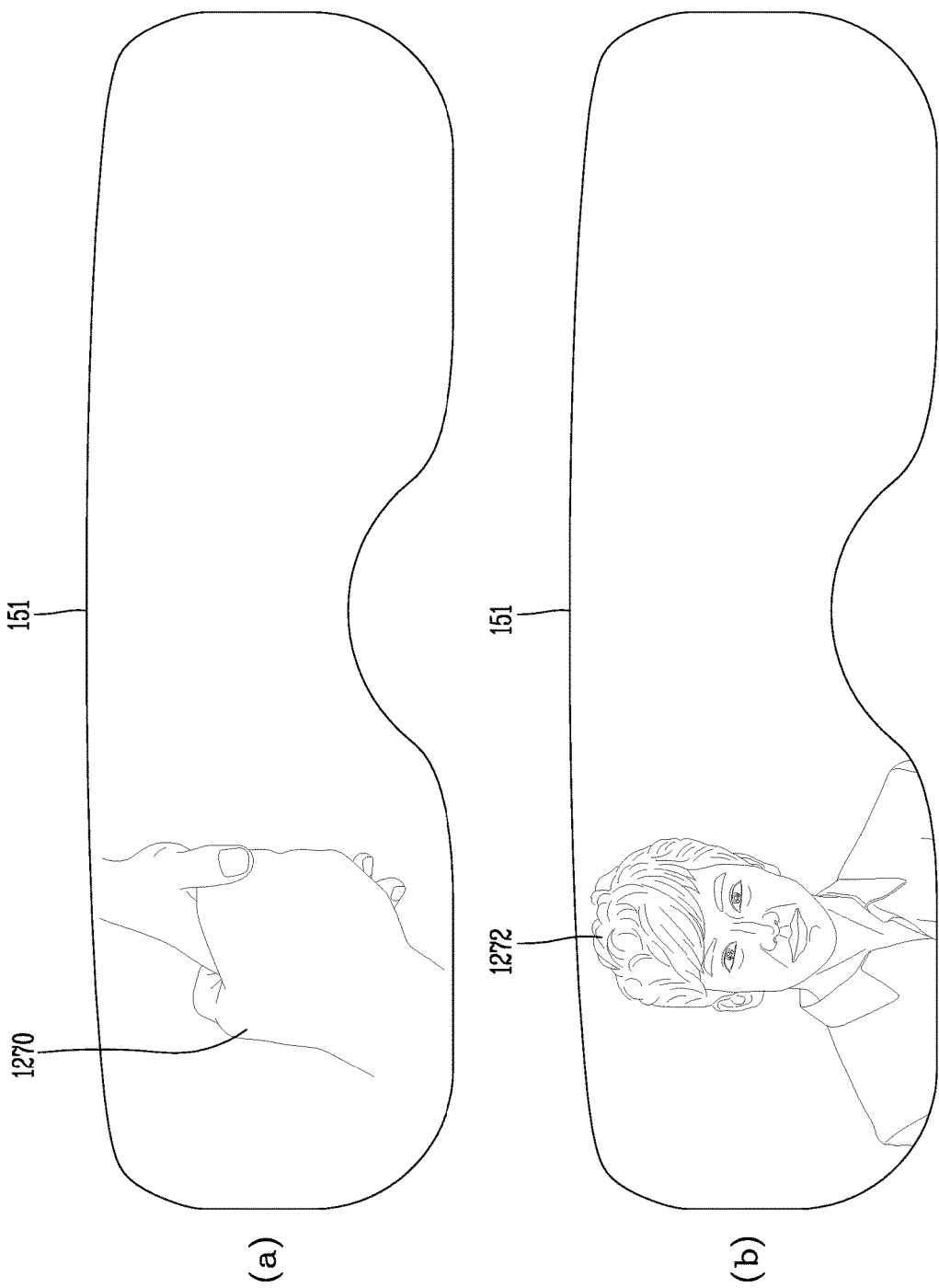

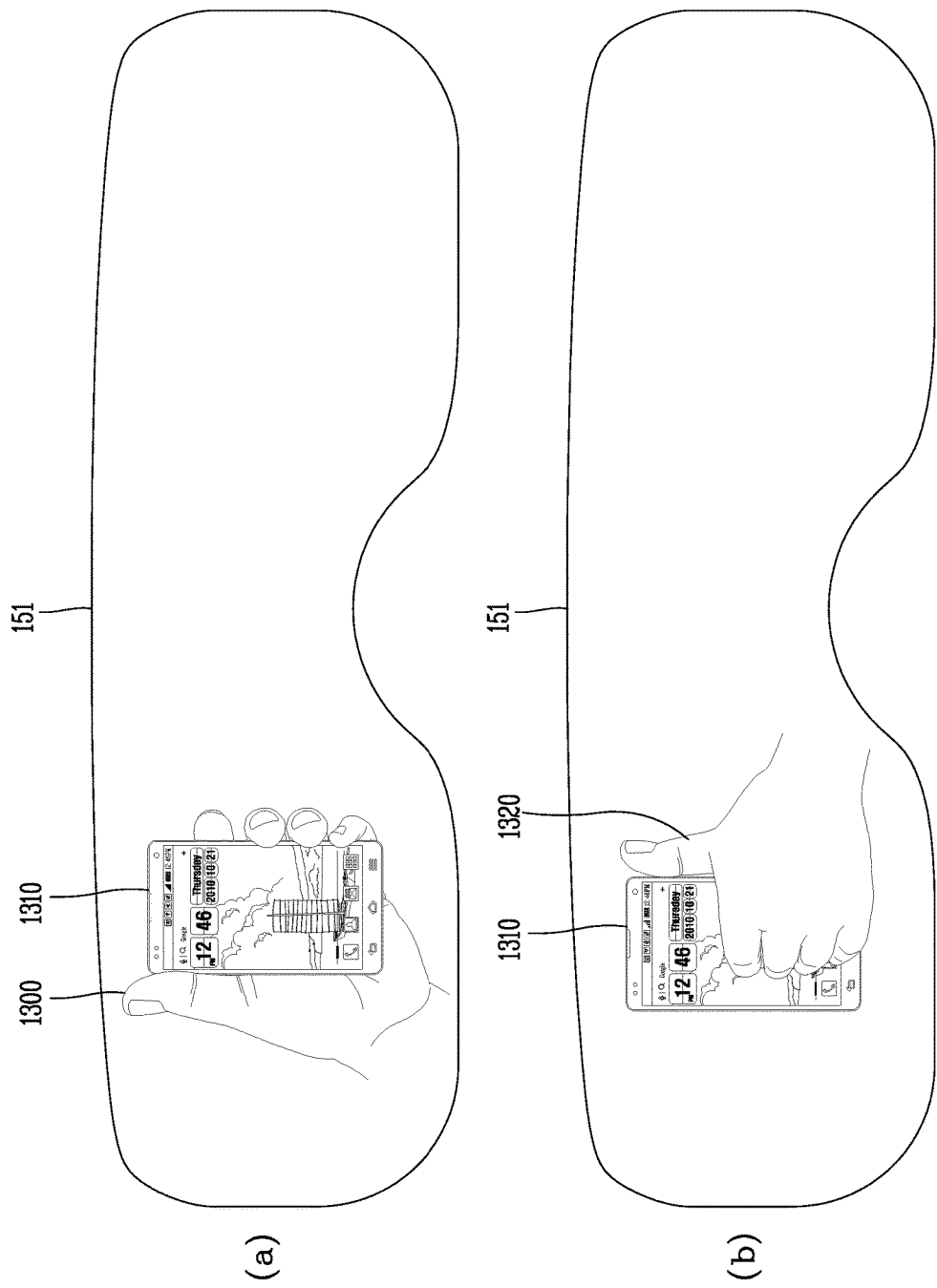

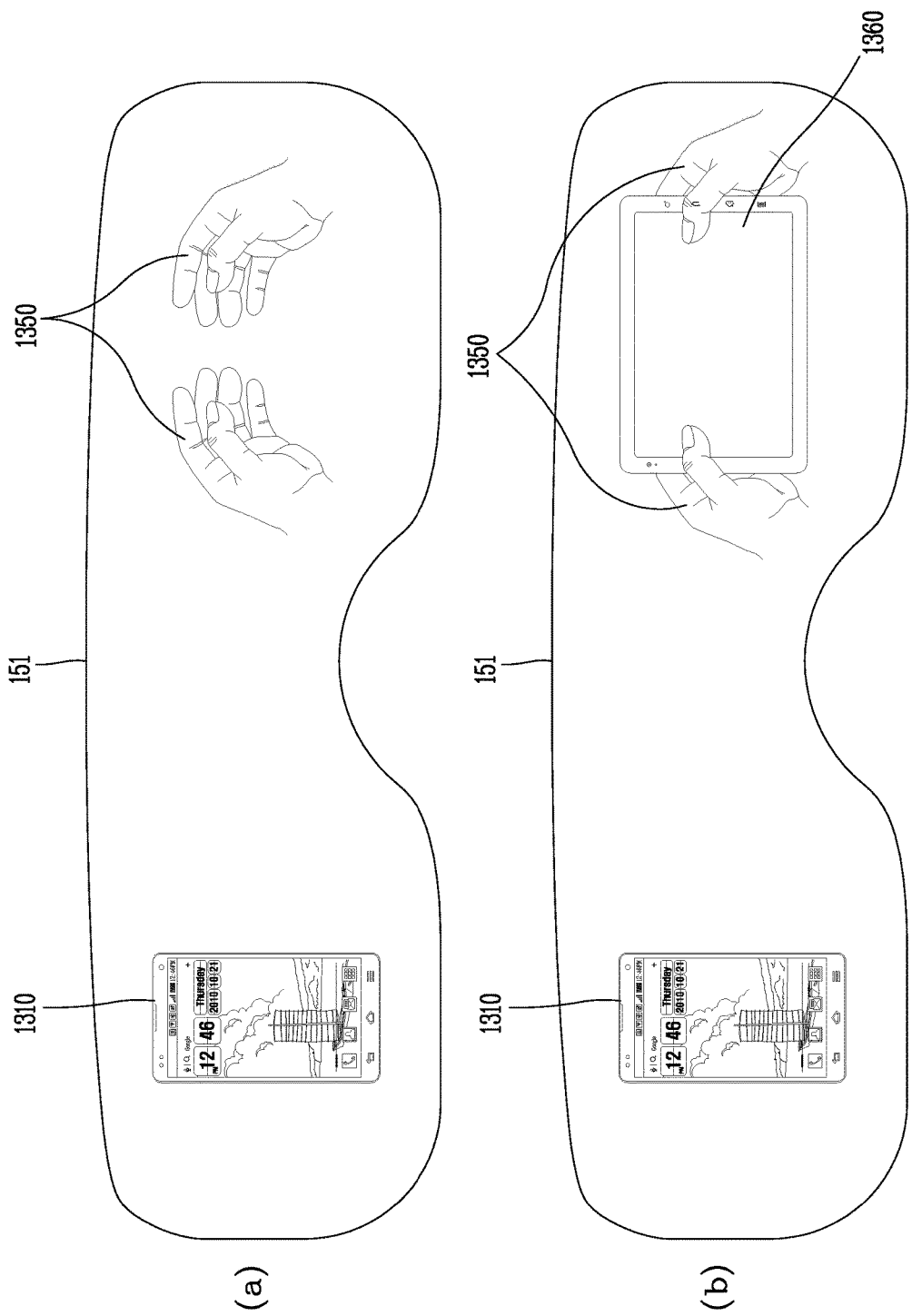

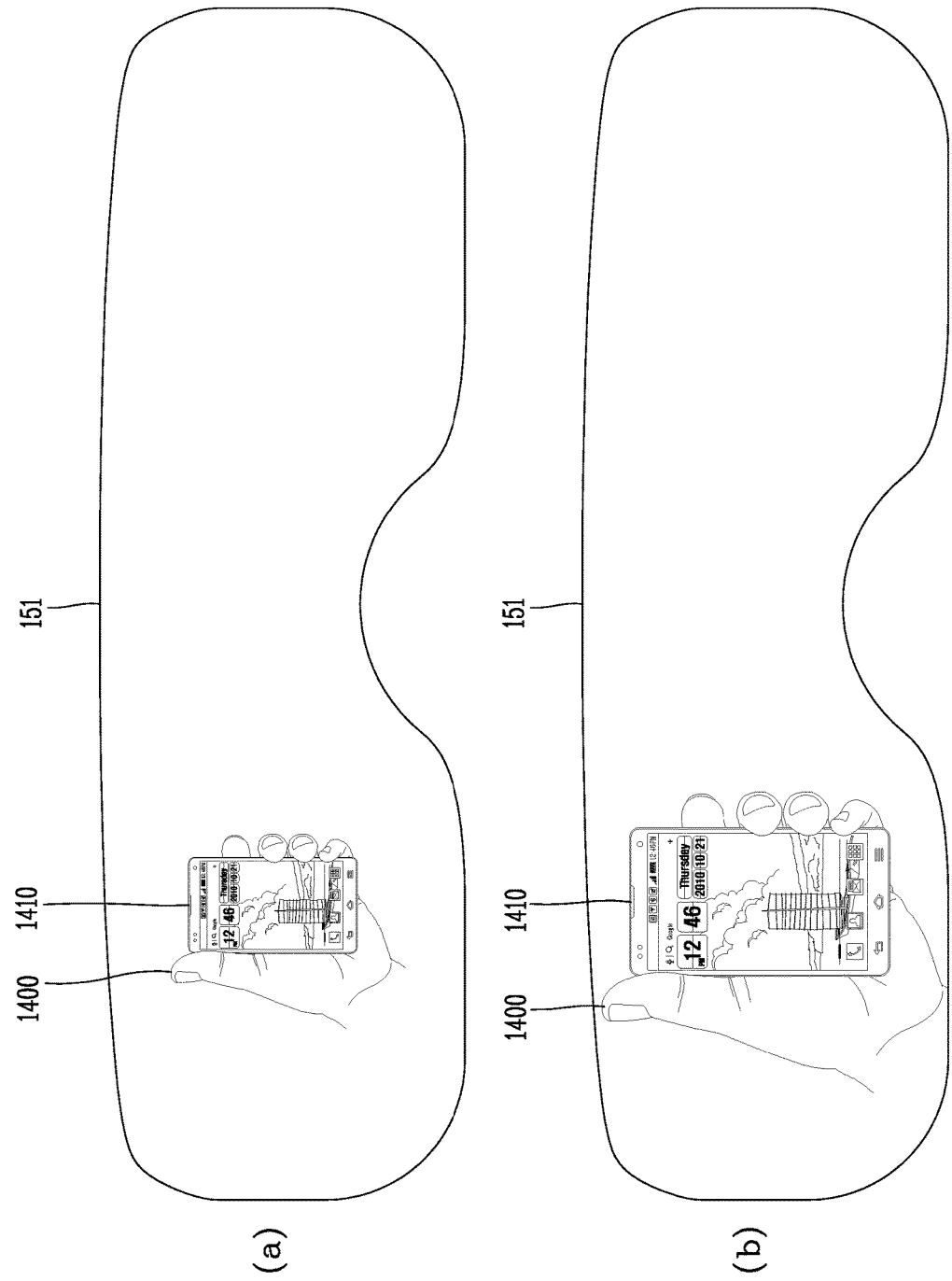

HEAD MOUNTED DISPLAY DEVICE FOR MULTI-TASKING AND METHOD FOR CONTROLLING SAME

TECHNICAL FIELD

The present disclosure relates to a terminal of eye-glass type (or a glass-type wearable device (terminal)), and a method for controlling the same.

BACKGROUND ART

As the information society develops rapidly, the importance of a display device capable of implementing a screen with a sense of reality is being emphasized. For instance, a head-mounted display (HMD) device is being researched.

The HMD device is mainly implemented as safety goggles or a helmet. Once a user wears the HMD device, the user can see a screen in front of his or her eyes. The HMD device has been developed for realization of a sense of virtual reality. A small display such as a liquid crystal display is installed at the HMD device close to a wearer's two eyes, so that images can be projected to the display. Recently, the HMD device is being widely developed for use in a space development center, a reactor building, a military agency and a medical institution, for business use or games, etc.

Thanks to such improvements, smart glasses, one example of the HMD device, are presented on the market. The smart glasses realized as a wearable device conveniently execute functions that are executed in the existing mobile terminal.

The smart glasses may include a function of performing communication with an external device. Accordingly, various methods for executing more various functions using the smart glasses or controlling more various functions using the smart glasses are actively being developed.

DISCLOSURE OF THE INVENTION

Therefore, an aspect of the detailed description is to provide a glass-type terminal (or a terminal for an eye-glass type) capable of selecting and executing more various functions even without a separate input device, and a method for controlling the same.

Another aspect of the detailed description is to provide a glass-type terminal capable of facilitating a control of various peripheral devices even without a separate input device, and a method for controlling the same.

To achieve these and other advantages and in accordance with the purpose of the present invention, as embodied and broadly described herein, there is provided a head mounted display device to output screen information, the head mounted display device including a sensing unit configured to sense a user's gesture from a movement of the user's body portion, a memory configured to store information related to at least one gesture, and information related to a function matched with the at least one gesture information, and a controller configured to search for a function matched with a sensed gesture based on the information stored in the memory when the gesture is sensed, and execute the searched function.

In one embodiment disclosed herein, the sensing unit may sense the user gesture when the user gesture is applied within a recognition area decided according to a preset sensing range.

In one embodiment disclosed herein, the controller may output screen information corresponding to each of a plurality of functions on the head-mounted display unit when the plurality of functions match the sensed gesture, and execute a function corresponding to one of the screen information according to a user selection.

In one embodiment disclosed herein, the controller may output one of the screen information on one area of the head-mounted display unit, through which the user's body portion is transmitted, and change the output screen information based on a user selection.

In one embodiment disclosed herein, the controller may output the screen information near one area of the head-mounted display unit, through which the user's body portion is transmitted.

In one embodiment disclosed herein, the controller may output screen information corresponding to each of a plurality of peripheral devices on the head-mounted display unit when the function matched with the gesture is a function associated with the plurality of peripheral devices, and control at least one peripheral device based on a user selection among the screen information, on the basis of an additional gesture sensed from the user.

In one embodiment disclosed herein, the controller may output one of the screen information on one area of the head-mounted display unit, through which the user's body portion is transmitted, and change the output screen information based on a user selection.

In one embodiment disclosed herein, the controller may output the screen information near one area of the head-mounted display unit, through which the user's body portion is transmitted.

In one embodiment disclosed herein, the at least one peripheral device may be at least one home appliance. The controller may connect with one of the at least one home appliance based on the additional gesture, output screen information related to the connected home appliance on the display unit, and control an operation of the connected home appliance based on a user gesture additionally sensed with respect to the screen information related to the home appliance.

In one embodiment disclosed herein, the at least one peripheral device may be at least one mobile terminal. The controller may connect with one of the at least one mobile terminal based on the additional gesture, output screen information related to the connected mobile terminal on the head-mounted display unit, and control a function associated with the connected mobile terminal based on the additional gesture when the additional gesture applied by the user is sensed from the screen information.

In one embodiment disclosed herein, the at least one peripheral device may be at least one mobile terminal connectable through wireless communication. The controller may connect the at least one peripheral device with each other based on a user gesture, output screen information corresponding to the connected at least one peripheral device on the head-mounted display unit, and control the at least one peripheral device to enable data exchange therebetween based on a user's additional gesture with respect to the screen information.

In one embodiment disclosed herein, when the sensed gesture is recognized as a gesture for playing a specific musical instrument, the controller may detect a kind of the musical instrument matched with a user gesture, and execute a function based on the kind of the musical instrument, in response to the user gesture.

In one embodiment disclosed herein, the function based on the kind of the musical instrument may be a score-associated function. The controller may output a part of one of scores decided according to the detected kind of the musical instrument on the head-mounted display unit in a manner of being distinguished from the other part of the one score. Here, the one score may correspond to a user's additional gesture, In one embodiment disclosed herein, the controller may execute a function of exchanging electronic business card information or a function of providing navigation information, based on a sensed user gesture, and output related screen information on the head-mounted display unit.

In one embodiment disclosed herein, when the sensed user gesture is a handshaking gesture and the function of exchanging the electronic business card information is selected as the matched function, the controller may receive the electronic business card information from at least one of adjacent mobile terminals, which is sensed in a direction that the head-mounted display unit faces.

In one embodiment disclosed herein, the controller may capture an image transmitted on the head-mounted display unit, and store information related to the captured image together with the electronic business card information.

In one embodiment disclosed herein, when the sensed user gesture is a driving gesture and the function of providing the navigation information is selected as the matched function, the controller may generate navigation information using a current location and prestored map information, and output the generated navigation information on the head-mounted display unit.

In one embodiment disclosed herein, the controller may output screen information related to the execution of the searched function on the head-mounted display unit, in a size decided based on a distance up to a user's body portion associated with the user gesture.

In one embodiment disclosed herein, the controller may execute the searched function and output screen information related to the execution of the searched function on the head-mounted display unit only while the gesture is sensed.

In one embodiment disclosed herein, when a preset specific gesture is sensed, the controller may maintain an executed state of the searched function and an output state of screen information related to the execution of the searched function, irrespective of the sensed state of the gesture.

To achieve these and other advantages and in accordance with the purpose of the present invention, as embodied and broadly described herein, there is provided a method for controlling a terminal of eye-glass type having a head-mounted display unit for outputting screen information, the method including sensing a user's gesture, searching for a function that matches the sensed gesture and executing the searched function, sensing an additional gesture applied by the user, and controlling the currently-executed function based on the additional gesture.

In one embodiment disclosed herein, the executing the searched function may further include allowing the user to select one of a plurality of functions when the plurality of functions match the sensed gesture, allowing the user to select one peripheral device based on whether or not the selected function is a function associated with peripheral devices, and executing a function associated with the user-selected function or the user-selected peripheral device.

In one embodiment disclosed herein, the allowing the user to select one of the plurality of functions may further include outputting screen information related to each of the plurality of functions on or around an area of the head-mounted display unit, on which the user's body portion associated with the user gesture is transmitted, and recognizing that the one function has been selected, in response to an additional gesture applied by the user to one of the output screen information.

In one embodiment disclosed herein, the allowing the user to select the one peripheral device may further include outputting screen information related to each of at least one connectable peripheral device on or around an area of the head-mounted display unit, on which the user's body portion associated with the user gesture is transmitted, when the selected function is a function associated with the peripheral devices, recognizing that the one peripheral device has been selected, based on an additional gesture applied by the user to one of the output screen information, and connecting with the selected peripheral device.

In one embodiment disclosed herein, the executing the searched function may further include outputting on the head-mounted display unit at least one of a list of connectable peripheral devices or a list of executable functions on the glass-type terminal when any function does not match the sensed gesture, allowing the user to select one function or one peripheral device from the at least one list, and executing a function linked with the selected one function or the selected one peripheral device.

ADVANTAGEOUS EFFECT

In a glass-type terminal (or a terminal of eye-glass type) and a control method thereof according to one embodiment disclosed herein, a user gesture may be sensed and a function matched with the sensed gesture may be executed, which may allow the user to execute various functions in the glass-type terminal even without a separate input device.

In a glass-type terminal (or a terminal of eye-glass type) and a control method thereof according to one embodiment disclosed herein, a user gesture may be sensed and a function linked with a specific peripheral device matched with the sensed gesture may be executed based on a user's additional gesture, which may allow the user to control various peripheral device using the glass-type terminal.

BRIEF DESCRIPTION OF THE DRAWINGS

FIG. 5 is a conceptual view illustrating an example in which gesture recognition is started in a glass-type terminal in accordance with one embodiment of the present invention.

FIGS. 6A and 6B are conceptual views illustrating the control method of FIG. 4.

FIGS. 8A, 8B, 8C and 8D are conceptual views illustrating an example of selecting one of a plurality of functions when a glass-type terminal provides the plurality of functions in accordance with one embodiment of the present invention.

FIGS. 9A, 9B, 9C and 9D are conceptual views illustrating an example of selecting one of a plurality of peripheral devices when a glass-type terminal is connectable with the plurality of peripheral devices in accordance with one embodiment of the present invention.

FIGS. 10A and 10B are conceptual views illustrating an example of executing a function associated (linked) with a specific peripheral device in a glass-type terminal in accordance with an embodiment of the present invention.

FIGS. 11A and 11B are conceptual views illustrating an example of executing a function associated (linked) with a plurality of peripheral devices in a glass-type terminal in accordance with an embodiment of the present invention.

FIGS. 12, 13A, 13B, 13C, 13D, 14A, 14B, 15A, 15B and 15C are conceptual views illustrating an example of executing a function matched with a user's gesture sensed in a glass-type terminal according to an embodiment of the present invention.

FIGS. 16A and 16B are conceptual views illustrating an example of executing at least one function in a state of maintaining a currently-executed function, in response to a user gesture, in a glass-type terminal according to an embodiment of the present invention.

FIG. 17 is a conceptual view illustrating an example of changing a size of screen information based on information related to a distance up to a user's body associated with a gesture in a glass-type terminal according to an embodiment of the present invention.

MODES FOR CARRYING OUT THE
PREFERRED EMBODIMENTS

Hereinafter, the present disclosure will be explained in more detail with reference to the attached drawings. For the sake of brief description with reference to the drawings, the same or equivalent components will be provided with the same reference numbers, and description thereof will not be repeated. The suffixes "module" and "unit or portion" for components used in the following description merely provided only for facilitation of preparing this specification, and thus they are not granted a specific meaning or function. If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

A glass-type terminal in the present description may include a mobile terminal such as a mobile phone, a smart phone, a notebook computer, a digital broadcasting terminal, Personal Digital Assistants (PDA), Portable Multimedia Player (PMP), a navigation system, a slate PC, a tablet PC and an ultra book. However, it will be obvious to those skilled in the art that the present disclosure may be also applicable to a fixed terminal such as a digital TV and a desktop computer, except for specific configurations applicable only to the glass-type terminal.

Figure 1:
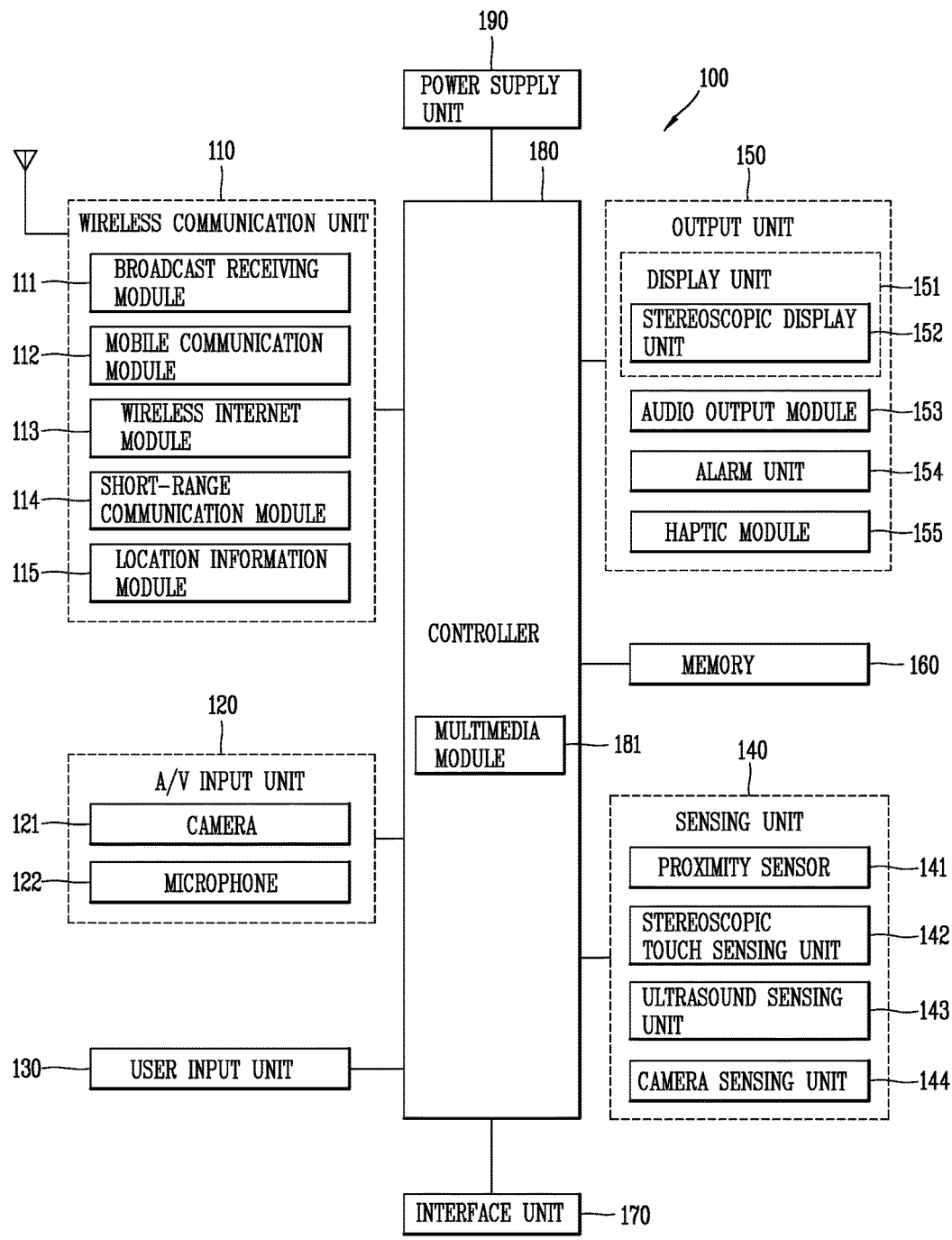
FIG. 1 is a block diagram of a glass-type terminal (or a terminal of an eye-glass type) according to an embodiment of the present invention.

FIG. 1 is a diagram illustrating a glass-type terminal (terminal of eye-glass type) according to one embodiment of the present invention.

The glass-type terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the glass-type terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the glass-type terminal 100 and a wireless communication system or between the glass-type terminal 100 and a network within which the glass-type terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a glass-type terminal. An example of the location information module 115 may include a Global Position System (GPS) module or a wireless fidelity (WiFi) module.

Still referring to FIG. 1, the A/V input unit 120 is configured to provide audio or video signal input to the glass-type terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the glass-type terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the glass-type terminal. The user input unit 130 may include a keypad, a dome switch, a touchpad (e.g., static pressure/capacitance), a jog wheel, a jog switch and the like.

The sensing unit 140 provides status measurements of various aspects of the glass-type terminal. For instance, the sensing unit 140 may detect an open/close status of the glass-type terminal, a change in a location of the glass-type terminal 100, a presence or absence of user contact with the glass-type terminal 100, the location of the glass-type terminal 100, acceleration/deceleration of the glass-type terminal 100, and the like, so as to generate a sensing signal for controlling the operation of the glass-type terminal 100. For example, regarding a slide-type phone when the glass-type terminal 100 is the slide-type phone, the sensing unit 140 may sense whether a sliding portion of the glass-type terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the glass-type terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, a switchable scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the glass-type terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor may have a more extended lifespan and higher utilization than the contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'floating touch' or 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the glass-type terminal 100 (e.g., a call signal reception sound, a message reception sound, etc.). The audio output module 153 may include a speaker, a buzzer or the like.

The alarm unit 154 outputs a signal for informing about an occurrence of an event of the glass-type terminal 100. Events generated in the glass-type terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the glass-type terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the glass-type terminal 100 may be operated in relation to a web storage device that performs the storage function of the memory 160 over the Internet.

The interface unit 170 serves as an interface with every external device connected with the glass-type terminal 100. For example, the external devices may transmit data to an external device, receives and transmits power to each element of the glass-type terminal 100, or transmits internal data of the glass-type terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the glass-type terminal 100 via the interface unit 170.

When the glass-type terminal 100 is connected with an external cradle, the interface unit 170 may serve as a passage to allow power from the cradle to be supplied therethrough to the glass-type terminal 100 or may serve as a passage to allow various command signals inputted by the user from the cradle to be transferred to the glass-type terminal therethrough. Various command signals or power inputted from the cradle may operate as signals for recognizing that the glass-type terminal is properly mounted on the cradle.

The controller 180 typically controls the general operations of the glass-type terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the glass-type terminal meets a preset condition. Also, the controller 180 may control a lock screen displayed in the lock state based on a touch input sensed on the display unit 151 in the lock state of the glass-type terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2A:
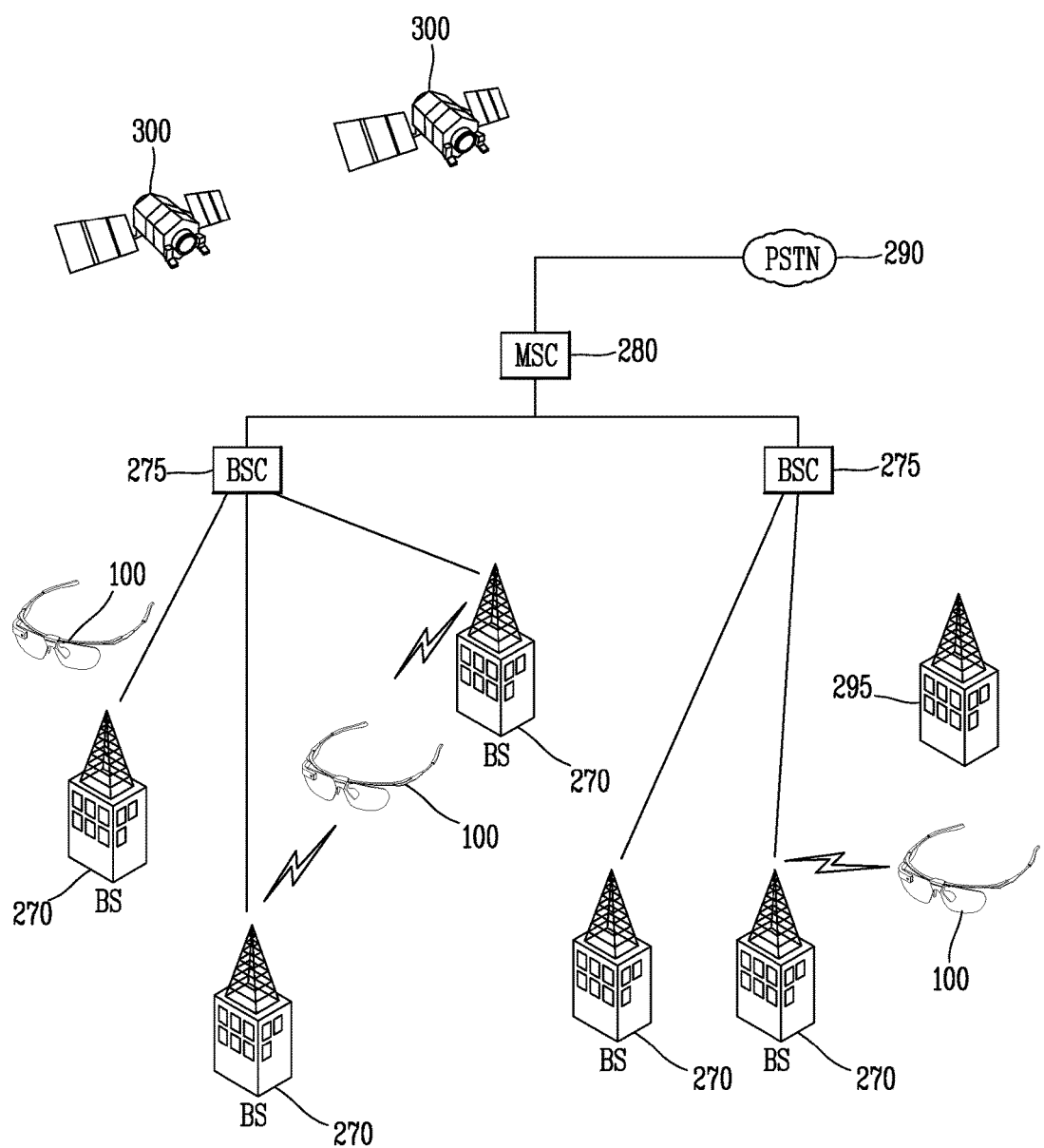
FIGS. 2A and 2B are conceptual views illustrating a communication system where a glass-type terminal according to the present invention is operable.
Figure 2B:
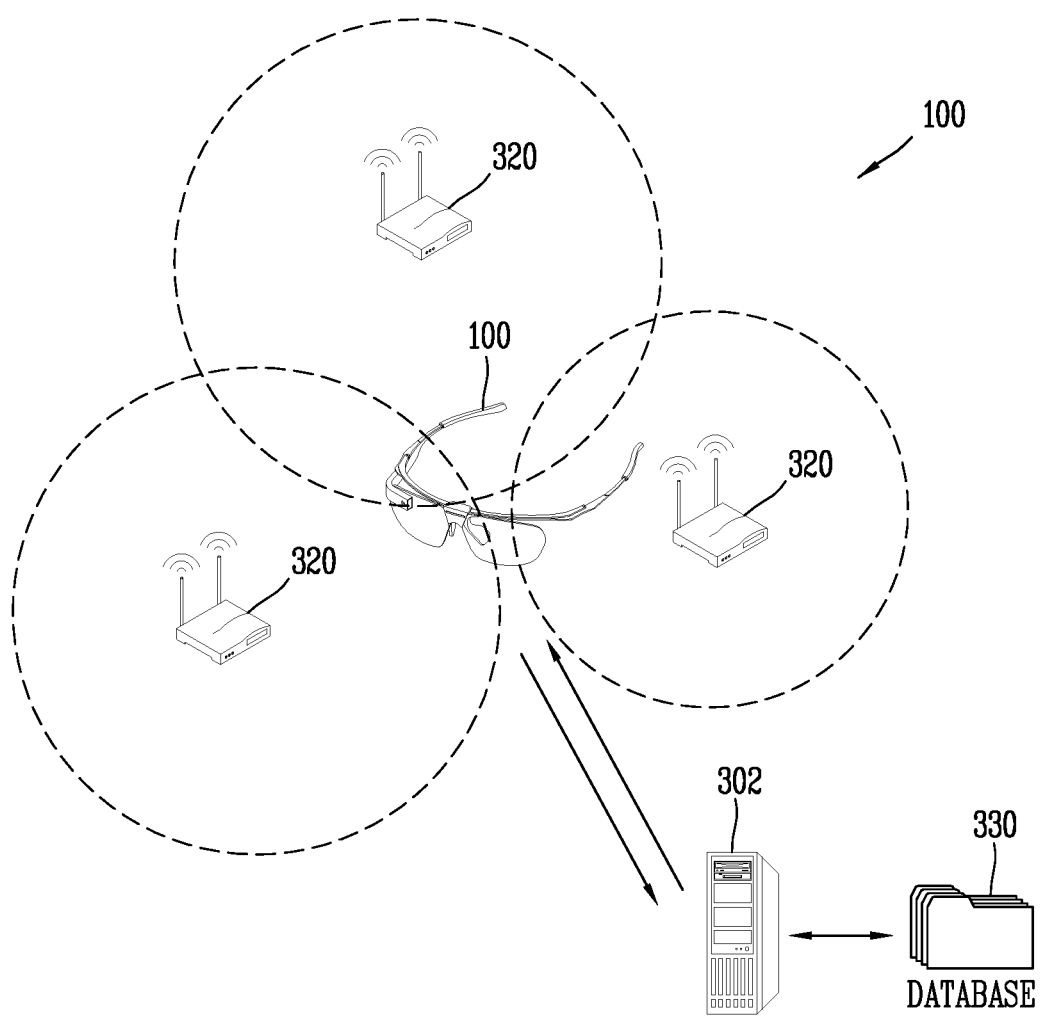

Hereinafter, a communication system which is operable with the glass-type terminal 100 according to the present disclosure will be described. FIGS. 2A and 2B are conceptual views of a communication system operable with a glass-type terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural glass-type terminals 100. Two satellites are depicted in FIG. 2A, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The glass-type terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the glass-type terminals 100.

Hereinafter, description will be given of a method for acquiring location information of a glass-type terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the glass-type terminal 100 using a WiFi module provided in the glass-type terminal 100 and a wireless access point 320 for transmitting and receiving to and from the WiFi module.

The WiFi positioning system 300 may include a WiFi location determination server 310, a glass-type terminal 100, a wireless access point (AP) 320 connected to the glass-type terminal 100, and a database 330 stored with any wireless AP information.

The WiFi location determination server 310 extracts the information of the wireless AP 320 connected to the glass-type terminal 100 based on a location information request message (or signal) of the glass-type terminal 100. The information of the wireless AP 320 may be transmitted to the WiFi location determination server 310 through the glass-type terminal 100 or transmitted to the WiFi location determination server 310 from the wireless AP 320.

The information of the wireless AP extracted based on the location information request message of the glass-type terminal 100 may be at least one of MAC address, SSID, RSSI, channel information, privacy, network type, signal strength and noise strength.

The WiFi location determination server 310 receives the information of the wireless AP 320 connected to the glass-type terminal 100 as described above, and compares the received wireless AP 320 information with information contained in the pre-established database 330 to extract (or analyze) the location information of the glass-type terminal 100.

On the other hand, referring to FIG. 2B, as an example, the wireless AP connected to the glass-type terminal 100 is illustrated as a first, a second, and a third wireless AP 320. However, the number of wireless APs connected to the glass-type terminal 100 may be changed in various ways according to a wireless communication environment in which the glass-type terminal 100 is located. When the glass-type terminal 100 is connected to at least one of wireless APs, the WiFi positioning system 300 can track the location of the glass-type terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the glass-type terminal 100 from the database 330 to extract the location information matched to the searched wireless AP, thereby extracting the location information of the glass-type terminal 100.

Figure 3:
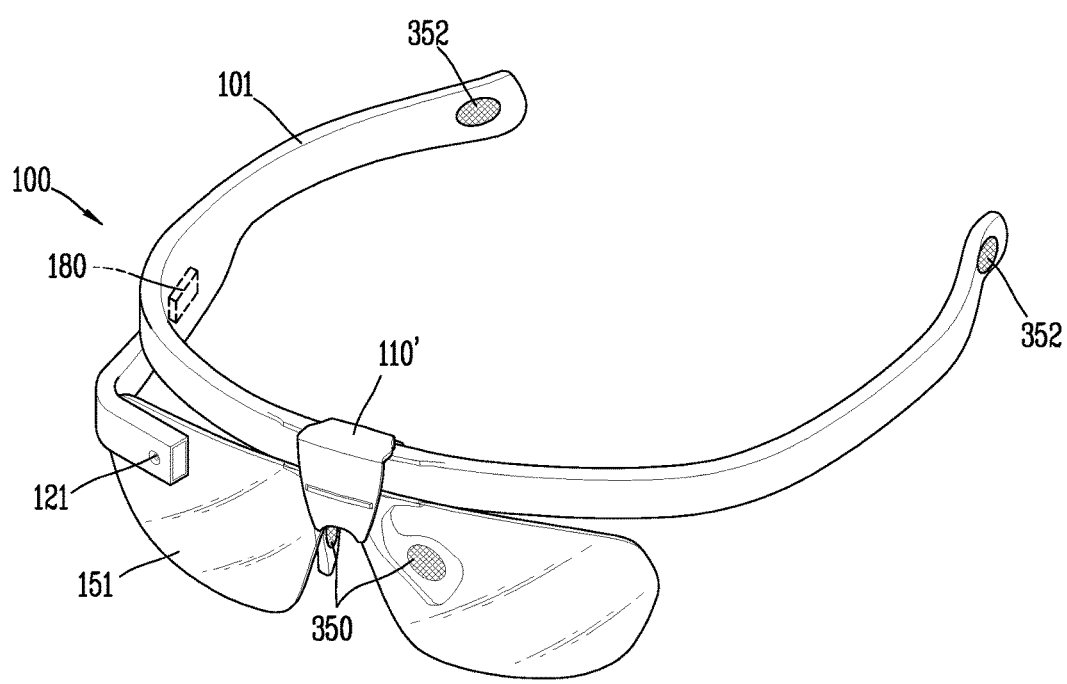
FIG. 3 is a conceptual view illustrating one embodiment of a wearable glass-type terminal in accordance with the present invention.

FIG. 3 is a conceptual view illustrating one embodiment of a wearable glass-type terminal in accordance with the present invention. Referring to FIG. 3, the wearable glass-type terminal according to the present invention includes a main body 100', a display unit 151 and a controller (or control unit) 180.

The wearable glass-type terminal 100 disclosed herein may be implemented into a head-mounted display (HMD), specifically, smart glasses. The main body 100' may be mountable on a head. For example, the main body 100' may be implemented by a frame and a temple in case of the smart glasses.

The display unit 151 may be coupled with the main body 100' and arranged at positions corresponding to both eyes. Also, the display unit 151 may be light-transmittable and output visual information.

The visual information refers to a virtual object, which is generated in the wearable glass-type terminal 100 or input from an external device. For example, the virtual object may refer to an application or an icon corresponding to the application, a content, a UI in a phone call mode, and the like. The virtual object may be generated by the controller 180 or received from a glass-type terminal, such as a smart phone. Here, since the display unit 151 is light-transmittable, a user can view external environments through the display unit 151.

Also, in one exemplary embodiment, the display unit 151 may allow a user to view the external environment therethrough and simultaneously output information related to an external object which constructs the external environment. For example, the external object may be a business card, a person or a mutual communication-available external device.

As aforementioned, the controller 180 may control the wearable glass-type terminal 100. In detail, the controller 180 may output information relating to an external device, which has been detected by a wireless communication unit 110, on the display unit 151.

For example, the controller 180 may identify a position of the detected external device. Here, the controller 180 may determine whether or not the detected external device is located within a user's view, and decide according to the determination result whether or not to output information related to the detected external device.

The controller 180 may also be mounted to the main body 100' of the wearable glass-type terminal 100, or integrally formed with the main body 100'. As another example, the controller 180 may be spaced apart from the main body 100'.

The camera 121 may be provided on a front surface of at least one of the left-eye and right-eye display units 151. Or, the camera 121 may also be provided at one side or both sides of the frame 310 to capture even a space outside the user's view.

The user input unit 130 may be implemented as a separate touch panel at one side or both sides of the frame 310. Or, the user input unit 130 may be implemented as a physical key. For example, a power on/off switch may be provided on one side of the frame 310.

As another example, the user input unit 130 may be implemented as a separate external device connected to the main body 100', such that the user can input a specific command to the separate external device. Or, the display unit 151 may be implemented as a touch screen so as to receive a control command directly from the user.

As another example, the user input unit 130 may be implemented as a module for recognizing a user's voice command, such that the user can input a specific command to the main body 100' by use of voice.

Meanwhile, as one example of a wearable glass-type terminal, smart glasses are released. The smart glasses implemented as a wearable device may execute functions, which are executed in the glass-type terminal, in a simple manner.

The display unit 151 of the smart glasses can simultaneously output the external environment viewed through the display unit 151 and the output visual information (i.e., realizing augmented reality). This may allow a user to more easily recognize information related to an object which configures the external environment.

Also, the smart glasses may execute wireless communications with other smart glasses, or with an external device which can communicate with the smart glasses. Here, information related to the external device may be output on the display unit.

Hereinafter, a method for controlling the glass-type terminal 100 in accordance with an embodiment of the present invention will be described in detail with reference to the accompanying drawings.

Figure 4:
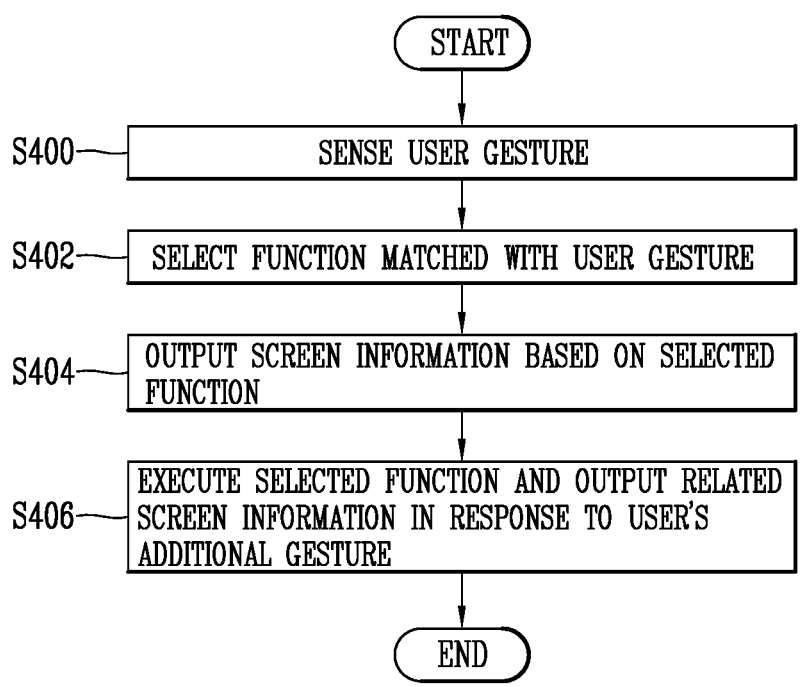
FIG. 4 is a flowchart illustrating a method for controlling a glass-type terminal in accordance with one embodiment of the present invention.

FIG. 4 is a flowchart illustrating a method for controlling a glass-type terminal in accordance with one embodiment of the present invention. FIGS. 6A and 6B are conceptual views illustrating the control method of FIG. 4.

As illustrated in FIG. 4, the glass-type terminal 100 according to the embodiment of the present invention starts gesture recognition according to a user selection.

For example, the controller 180 may start the gesture recognition when the user inputs a predetermined voice command word (e.g., Start gesture recognition) or presses a specific button provided on the body 100'.

Or, the controller 180 may start the gesture recognition when a user's touch is sensed on a specific portion of the frame 310 constructing the body 100' or a specific portion of the temple or according to a type of the user's touch input. For example, the controller 180 may determine that the gesture recognition has started when a touch input is applied to the specific portion of the frame 310 or the temple constructing the body 100' for more than a preset time or a touch input is applied by more than a preset number of times within a preset time.

Or, the controller 180 may sense a movement of the user's eyes and determine that the gesture recognition has started when the user's eyes see a preset direction. To this end, the sensing unit 140 may further be provided with an electrooculogram (EOG) sensor for sensing the movement of the user's eyes.

Or, the controller 180 may sense whether or not the gesture recognition has started by detecting a specific operation when the user performs the specific operation. For example, the sensing unit 140 may further be provided with at least one sensor for sensing an operation or non-operation of the user, and the controller 180 may recognize the user's specific operation using a sensing value obtained from the sensor.

For example, the sensing unit 140 may further include at least one of an acceleration sensor for sensing acceleration generated when a position of the glass-type terminal 100 is changed and a contact sensor for sensing whether or not the user's skin has been brought into contact with it. When the generation of acceleration is sensed from the acceleration sensor, the controller 180 may recognize the change in the current position of the glass-type terminal 100 based on the sensing value of the contact sensor, and determine that the gesture recognition has started according to the recognized position.

FIG. 5 is a conceptual view illustrating an example in which the gesture recognition is started in response to the change in the position of the glass-type terminal.

As illustrated in (a) of FIG. 5, the contact sensors may be provided on each temple closely contactable with both ears of the user, and a middle portion of the frame 310 closely contactable with the user's nose. Each contact sensor senses whether or not the user's skin has been brought into contact with the glass-type terminal.

In this state, as illustrated in (b) of FIG. 5, it may be assumed that the user raises the glass-type terminal 100 up with picking up the central portion of the frame 310. In this instance, the acceleration sensor provided in the sensing unit 140 may sense an acceleration value with respect to an upward movement of the glass-type terminal 100. Here, the contact sensor provided on the middle portion of the frame 310, namely, the portion closely brought into contact with the user's nose fails to sense the contact, whereas the contact sensors provided on the temples of the glass-type terminal 100 can continuously sense the contact.

In this instance, namely, in the state that any contact is not sensed by the contact sensor provided on the portion closely contacting the nose after the generation of the upward acceleration, when the contact with the contact sensors closely adhered on the ears of the user is continuously sensed for a predetermined time, the controller 180 may determine that the gesture recognition has started. The controller 180 may also output a graphic object for notifying the start of the gesture recognition to the user on at least partial region of the head-mounted display unit 151.

Or, after the state sensed in (b) of FIG. 5, namely, the state that the contact sensor provided on the portion of the frame 310 closely adhered on the noise does not sense a contact but the contact sensors provided on the temples closely adhered on the ears continuously sense a contact, is maintained for more than a predetermined time, when returning to the original state, namely, the state that those contact sensors provided on the portion of the frame 310 closely adhered on the nose and provided on the temples closely adhered on the ears all sense the contact. That is, as illustrated in (b) and (c) of FIG. 5, after the user slightly raises the frame portion of the glass-type terminal 100, when the glass-type terminal 100 returns to the original state after a lapse of the predetermined time, the controller 180 may determine that the gesture recognition has started.

Or, only when the user's specific operation is sensed in a state of always turning on the gesture recognition function, the controller 180 may recognize that a user's gesture to be applied later is to execute a specific function.

Here, of course, the user's specific operation does not have to be recognized through the head-mounted display unit 151. For example, the glass-type terminal 100 according to the embodiment of the present invention may include an ultrasonic sensor, an infrared sensor and the like provided on the temples of the body. In this instance, when the user makes a preset specific motion (operation) like covering his or her ears with hands, the controller 180 may sense the user's motion sensed around the user's ears even though the user's motion is made out of a recognition area of the head-mounted display unit 151, thereby determining that the gesture recognition has started for executing a specific function.

Once the gesture recognition is started, the controller 180 may sense a user's gesture from an image output on a preset recognition area of the head-mounted display unit 151 (S400).

Here, the controller 180 may sense the user's gesture using two-dimensional (2D) image information related to an image of the user's gesture transmitted through the display unit 151. For example, the controller 180 may sense a portion of the user's body associated with the user's gesture, which is transmitted through the display unit 151, within a preset recognition area of the glass-type terminal 100.

Here, whether or not the portion of the user's body is present within the preset recognition area may be decided based on a distance from the portion of the user's body, namely, a hand to the glass-type terminal 100, for example. The recognition area, for example, may be decided according to a sensing range of the sensing unit 140 provided on the glass-type terminal 100. The sensing range may be preset by a manufacturer of the glass-type terminal 100 or according to a user selection.

When the portion of the user's body is sensed within the preset recognition area, the controller 180 may sense the user's gesture according to the motion of the portion of the user's body transmitted through the display unit 151. The gesture may be recognized based on a feature point corresponding to the portion of the user's body. In more detail, the controller 180 may extract the feature point from the 2D image information related to the user's hand, finger or the like.

The feature point may be provided in various forms. For example, the extracted feature point may be a position of a fingertip, a shape or direction of a finger or hand, whether an image is associated with one hand or both hands, and the like.

Also, the feature point may be extracted from three-dimensional (3D) information, which further includes distance information related to the hand or finger, as well as the 2D image information. For example, the controller 180 may acquire location information and distance information related to the portion of the user's body, namely, the hand or finger, in relation to the gesture, by using a laser sensor, an infrared sensor or a photo sensor provided in the sensing unit.

The controller 180 may acquire 3D information related to the user's hand or finger by adding the location information and the distance information to the 2D image information. The controller 180 may extract a feature point to be matched with a specific function from the acquired 3D information.

When the feature point is extracted from the body portion associated with the user's gesture, the controller 180 searches for a specific function that matches the extracted feature point of the user based on prestored information in the memory 160.

The memory 160 may previously store information related to specific functions to be matched with feature points sensed from a user's gesture. Also, the user can store information related to the function matched with the recognized specific gesture in the memory 160.

For example, the user may set a gesture of gripping (holding) a specific device to match a function associated with the specific device. For example, the user may recognize a gesture of making a hand shape gripping a mobile phone and store the gesture to match a mobile phone function or a function for controlling the mobile phone. Or, the user may allow the controller 180 to recognize a gesture of making a hand shape holding the mobile phone using both hands, and store the gesture to match a tablet PC function or a function for controlling the tablet PC.

Also, the specific function may be a function executable on the glass-type terminal 100. For example, the specific function may be a communication function such as a call orientation or reception or data transmission and reception with an external server (e.g., a cloud server, etc.). Or, the specific function may be a function for providing location information to the user.

Or, the specific function may be a function associated with at least one peripheral device which is connectable with the glass-type terminal 100. For example, the specific function may be a function capable of controlling at least one peripheral device. Or, the specific function may be a function of transmitting and receiving data using a plurality of terminals according to a user selection.

Also, the specific function may be a function using an application stored in the glass-type terminal 100 or at least one of peripheral devices connectable with the glass-type terminal 100.

Meanwhile, the controller 180 may select one function that matches the sensed user's gesture among various functions prestored in the memory 160. However, gestures corresponding to specific functions, respectively, may be similar to one another. In this instance, the controller 180 can also search for a plurality of functions from the function matched with the sensed gesture. Therefore, the controller 180 may allow the user to select one function when there are the plurality of functions corresponding to the sensed gesture.

The controller 180 may also allow the user to select a specific function or an associated (linked) function with a peripheral device according to whether the function corresponding to the sensed gesture is a function which can be provided by the glass-type terminal 100 itself or a function which can be provided in association with the peripheral device. Also, when there are a plurality of connectable peripheral devices, the controller 180 may allow the user to select at least one peripheral device which can be associated with the glass-type terminal 100.

As such, the step S402 in which the controller 180 searches for functions that match the user gesture and allows the user to select a specific function will be described later in more detail with reference to FIG. 7.

Meanwhile, when one of the specific functions is selected by the user in response to the user gesture sensed in the step S400, the controller 180 may output screen information related to the selected specific function on the display unit 151 (S404).

(a) and (b) of FIG. 6A and (a) and (b) of FIG. 6B illustrate the related examples.

When the gesture recognition is started, the controller 180 may acquire at least one of 2D image information or 3D information related to the user gesture through the preset recognition area of the display unit 151. The controller 180 may then sense the user gesture through the acquired information and search for a specific function matched with the sensed gesture.

For example, as illustrated in (a) of FIG. 6A, when a user gesture 600 like gripping a mobile phone with a hand is applied, the controller 180 may search for a mobile phone function as a function matched with a feature point extracted from the gesture 600. In this instance, the controller 180, as illustrated in (b) of FIG. 6, may control the display unit 151 to output screen information related to the mobile phone function. Here, the controller 180 may also output the screen information related to the mobile phone function to be output on one area of the display unit 151, through which the body portion associated with the user gesture is transmitted, or near (around) the one area. Therefore, as illustrated in (b) of FIG. 6, the screen information related to the mobile phone function may be output on an area of the display unit 151 through which the user's hand is transmitted.

Here, the screen information may be configured in the form of a home screen, for example. That is, the screen information may be decided according to a function that currently matches the user gesture. Therefore, as illustrated in (a) and (b) of FIG. 6A, when the function matched with the sensed user gesture is the mobile phone function, various functions associated with the mobile phone function, for example, items corresponding to basic phone functions, such as call origination or reception or message transmission or reception, may be included in the screen information.

The screen information may also include items corresponding to various applications, respectively. For example, the screen information may include items corresponding to applications for watching movies or reading books. In this instance, the controller 180 may sense a user gesture applied to at least one of the items, and execute at least one application in response to the user gesture.

Meanwhile, the screen information may also be configured in various forms. FIGS. 6A and 6B illustrate the examples of displaying screen information in a form similar to a home screen of the mobile phone because the mobile phone function is selected. However, the screen information may alternatively have a different shape from that illustrated in (b) of FIG. 6, namely, include other items if another function is selected.

For example, if the function matched with the user gesture is a function for controlling a tablet PC, the screen information may include items corresponding to various functions that can be provided by the tablet PC. Similar to this, if the function matched with the user gesture is a remote controller for controlling a home appliance, the screen information may include items for controlling functions according to a home appliance desired to control.

Meanwhile, when the screen information related to the specific function is output on the display unit 151, the controller 180 may sense an additional gesture applied by the user to the output screen information. For example, when the user applies a gesture for selecting one of items included in the screen information, the controller 180 may sense it and determine that the user has selected the one item.

For example, when the user moves a finger, the controller 180 may sense 3D information related to the user's fingertip using the laser sensor and the photo sensor provided in the sensing unit 140. The controller 180 may detect a specific item on the screen information corresponding to the user's fingertip using the sensed 3D information. Or, when an image corresponding to the user's fingertip is located at an output area of the specific item on the screen information, the controller 180 may determine that the specific item has been selected by the user.

For example, the controller 180 may determine whether a specific fingertip of the user is currently moving or stopped, using an image corresponding to the user's fingertip. When the image corresponding to the user's specific fingertip is stopped at an output position of a specific item on the screen information for a preset time, the controller 180 may determine that the specific item has been selected by the user.

Or, when another gesture is sensed, irrespective of the movement of the user's finger for selecting the specific item, the controller 180 may also determine that the specific item has been selected. That is, the controller 180 may determine that a specific item has been selected, by sensing a gesture made by the user's both hands or the fingers of the user's both hands with respect to screen information output on the display unit 151.

For example, when a user gesture gripping a mobile phone with one hand is sensed, the controller 180 may output screen information, as illustrated in (a) and (b) of FIG. 6A, on the display unit 151. When a movement of a finger of the user's another hand is applied with respect to a plurality of items included in the screen information, the controller 180 may sense it.

In this instance, the controller 180 may sense whether or not the finger of the hand which is currently making the gesture of gripping the mobile phone makes a gesture of pressing a specific button. That is, the screen information may further include a graphic object in the shape of the specific button, and the specific button may be output near the screen information related to the mobile phone function, namely, near an area of the display unit 151 through which the specific finger of the hand making the gesture of gripping the mobile phone is transmitted.

When the specific finger makes a gesture like pressing the graphic object in the shape of the specific button, the controller 180 may sense it. When the gesture like pressing the graphic object in the shape of the specific button is sensed, the controller 180 may detect one item corresponding to a position of a specific finger (e.g., a forefinger) of the user's another hand. The controller 180 may then determine that the detected item has been selected by the user.

For example, as illustrated in (a) of FIG. 6B, when an item corresponding to the user's fingertip is a call-placing item, the controller 180 may output screen information including a phonebook list 612. When one of fingers of the hand making a gesture of gripping the mobile phone makes a gesture like pressing the graphic object in the shape of the specific button, the controller 180 may detect one phone number 622 corresponding to a position of a specific finger of another hand from the phonebook list 612 output on the display unit 151. Or, when an image corresponding to the user's fingertip is stopped at a position corresponding to the one phone number 612 for a preset time, the controller 180 may determine that the phone number 612 has been selected by the user.

When the one phone number 612 is selected, the controller 180 may place a call with the selected phone number 612. In this instance, the controller 180, as illustrated in (b) of FIG. 6B, may output a screen 622 including information related to a callee of the placed call.

Figure 7:
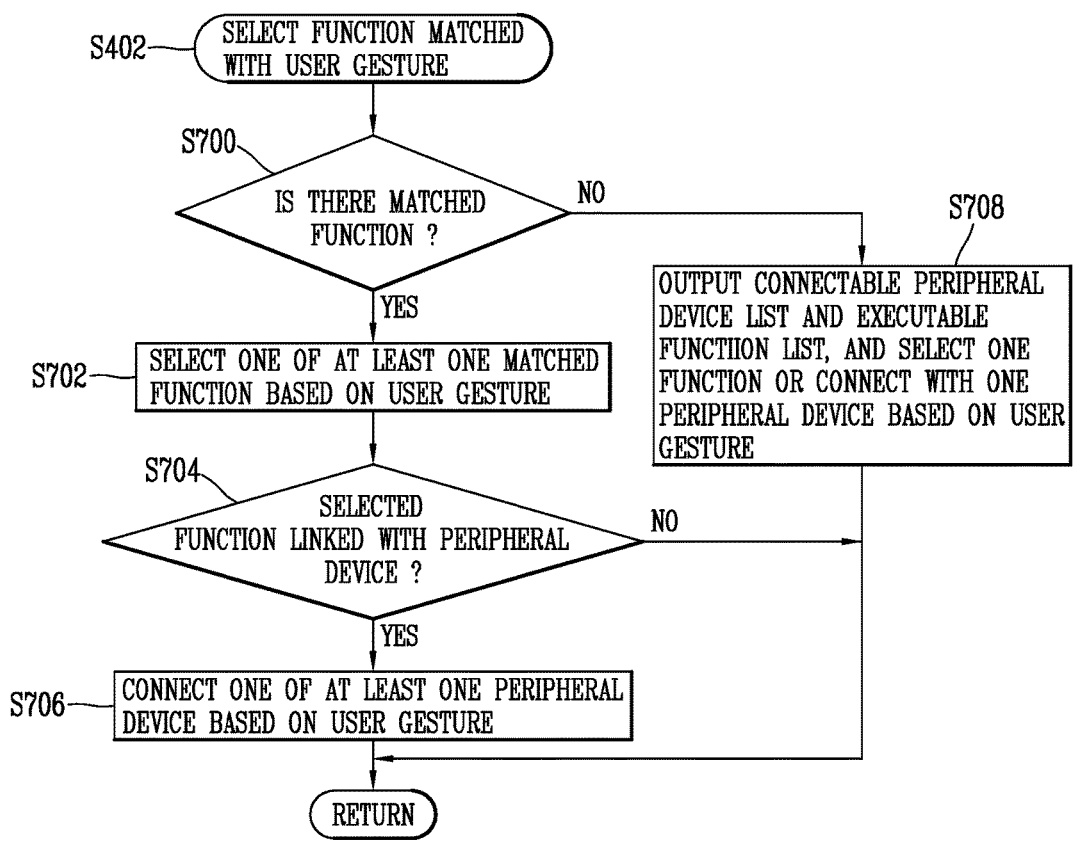
FIG. 7 is a flowchart illustrating in more detail a process of selecting a function matched with a sensed gesture in the control method of FIG. 4.

FIG. 7 is a flowchart illustrating in more detail the process of selecting the function matched with the sensed gesture in the control method of FIG. 4.

When the user gesture is sensed in the step S400, the controller 180 may determine whether or not there is a matched function (S700). When there is no matched function according to the determination of the step S700, the controller 180 may go back to the step S400 and sense the user gesture again.

However, when there is no matched function according to the determination of the step S700, the controller 180 may output at least one of a list of connectable peripheral devices or a list of functions executable on the glass-type terminal 100. When an additional gesture of the user applied to at least one list output on the display unit 151, namely, to at least one of the peripheral device list or the function list is sensed, the controller 180 may determine that one peripheral device or function corresponding to the sensed additional gesture has been selected by the user.

For example, when it is determined that one function has been selected, the controller 180 may go back to the step S404 and output screen information related to the selected function on the display unit 151. Or, when it is determined that one peripheral device has been selected, the controller 180 may perform a connection with the selected peripheral device through wireless communication or the like. In this instance, the controller 180 may control the display unit 151 to output screen information related to a function associated with the peripheral device.

Meanwhile, when the function matched with the gesture sensed in the step S400 is in plurality, the controller 180 may allow the user to select one of the plurality of matched functions (S702).

FIGS. 8A, 8B, 8C and 8D are conceptual views illustrating examples of selecting one of a plurality of functions when the plurality of functions are present in a glass-type terminal in accordance with one embodiment of the present invention.

For example, the controller 180 may output screen information related to each of a plurality of functions matched with a sensed gesture on the display unit 151 in a sequential manner or at once, and select one function based on a user selection.

First, FIGS. 8A and 8B illustrate an example under assumption of sequentially outputting the screen information related to each of the plurality of functions.

As illustrated in (a) of FIG. 8A, when a user gesture 800 is sensed, the controller 180 may search for a plurality of functions that match the sensed user gesture 800. The controller 180 may output graphic objects corresponding to the searched plurality of functions on the display unit 151. For example, when the functions corresponding to the user gesture 800 are a remote controller function and a mobile phone function, the controller 180 may output graphic objects corresponding to the remote controller function and the mobile phone function on the display unit 151.

Here, the graphic objects may also be output on a display area through which the user's body portion associated with the gesture 800 is transmitted or near the display area. The graphic objects may be sequentially output one by one based on a preset order.

(b) of FIG. 8A illustrates this example.

For example, when the preset order is to first output the remote controller function, followed by the mobile phone function, the controller 180, as illustrated in (b) of FIG. 8A, may output a graphic object 812 corresponding to the remote controller function near an area of the display unit 151, through which the user's body portion, namely, the user's hand associated with the gesture 800 is transmitted.

Here, the graphic object 820 may be output in the shape of the remote controller, but as illustrated in (b) of FIG. 8B, output in a manner of outputting only an outline in a form of a layout. This may increase a processing speed for the displayed graphic object such that the user can select a desired function faster. However, the controller 180 may also output the graphic object 820 in a shape similar to a real remote controller, other than the form of the layout, according to a user selection.

The graphic object 820 may also additionally be provided with at least one graphic object which can be selected by the user. For example, the controller 180 may additionally output on the display unit 151 a graphic object 810 in a shape of a button for the user to select a function corresponding to a currently-output graphic object 820, or a graphic object 812 in a shape of a button for outputting a graphic object corresponding to another function.

The controller 180 may sense the user selection with respect to one of the graphic objects 810 and 812. For example, when a user gesture (e.g., a gesture pressing a specific button) is sensed with respect to one of the graphic objects 810 and 812, the controller 180 may determine that the one graphic object has been selected.

For example, when an additional gesture, namely, a gesture like pressing the graphic object 812 is applied by the user at an output position of the graphic object 812, the controller 180 may determine that the user has selected the graphic object 812, namely, an output of a graphic object corresponding to another function. In this instance, the controller 180 may output a graphic object associated with a function corresponding to a next output order, namely, the mobile phone function, on the display unit 151. (a) of FIG. 8B illustrates this example.

Accordingly, a graphic object 822 corresponding to the function to be output in the next order, namely, the mobile phone function may be output on the display unit 151. The graphic object 822, as illustrated in (b) of FIG. 8A, may further output thereon a graphic object 810 in a shape of a button for selecting a function corresponding to a currently-output graphic object 820, or a graphic object 812 in a shape of a button for outputting a graphic object corresponding to another function.

In this state, when an addition gesture, namely, a gesture like pressing the graphic object 810 is made by the user, the controller 180 may determine that a function corresponding to the graphic object 822 currently output on the display unit 151 has been selected. The controller 180 may output screen information 826 related to the currently-selected function, namely, the mobile phone function, on the display unit 151.

The screen information may be output around a display area, through which the user's body portion, namely, the user's hand associated with the gesture 800 is transmitted. (b) of FIG. 8B illustrates this example.

Therefore, as illustrated in (b) of FIG. 8B, when the mobile phone function is selected from the plurality of functions, the controller 180 outputs the screen information 826 related to the mobile phone function on the display unit 151. When an additional gesture is applied by the user with respect to the output screen information, the mobile phone function corresponding to the gesture may be executed. Therefore, the controller 180, as illustrated in FIG. 6, may sense a finger position based on the user gesture, so as to execute a typical mobile phone function, such as placing a call or checking a text message.

Meanwhile, FIGS. 8A and 8B illustrates the example of sequentially outputting graphic objects corresponding to the plurality of functions matched with the sensed gesture 800, but such graphic objects may alternatively be output on the display unit 151 in a different manner. For example, the graphic objects corresponding to the plurality of functions may all be output on the display unit 151 and one of the graphic objects may be selected based on the user's additional gesture.

FIG. 8C illustrates this example.

For example, as illustrated in (a) of FIG. 8C, when the user gesture 800 is sensed, the controller 180 searches for a plurality of functions matched with the sensed user gesture 800. The controller 180 may output graphic objects corresponding to the searched plurality of functions around an area on the display unit 151 through which the user's body portion associated with the user gesture 800 is transmitted. (b) of FIG. 8C illustrates this example.

As illustrated in (b) of FIG. 8C, when the functions that match the user gesture 800 are a remote controller function and a mobile phone function, the controller 180 may output graphic objects 830, 832 corresponding to the remote controller function and the mobile phone function 832, respectively, on the display unit 151. As illustrated in (a) of FIG. 8D, when an additional gesture (e.g., a gesture selecting one graphic object with a finger; 840) is made by the user with respect to one of the graphic objects corresponding to each of the functions, the controller 180 may determine that the user has selected the one function.

That is, as illustrated in (a) of FIG. 8D, when the user selects the graphic object 830 corresponding to the mobile phone function, the controller 180 may determine that the user has selected the mobile phone function. In this instance, as illustrated in (b) of FIG. 8D, the controller 180 may output screen information 850 related to the mobile phone function on the display unit 151. And, when an additional gesture made by the user is sensed with respect to the output screen information 850, the mobile phone function may be executed based on the additional gesture.

Meanwhile, FIGS. 8A, 8B, 8C and 8D have illustrated the examples under assumption that the specific function is a function which can be provided by only the glass-type terminal 100, but the specific function may not be limited to this. For example, the specific function may be a function for controlling other connectable peripheral devices.

When the specific function is a function for controlling other connectable peripheral devices, the controller 180 may search for connectable peripheral devices that match the user gesture sensed in the step S400. Here, the connectable peripheral device may be at least one peripheral device connectable to the glass-type terminal 100 according to a position or state of the glass-type terminal 100, among peripheral devices preset by the user. Or, the connectable peripheral device may be at least one connectable peripheral device which is searched in response to the user's peripheral device search request.

When a plurality of connectable peripheral devices match the gesture sensed in the step S400, the controller 180 may output graphic objects corresponding to the plurality of peripheral devices, respectively, on the display unit 151 at once or in a sequential manner.

FIGS. 9A, 9B, 9C and 9D illustrate examples in which the user selects one peripheral device when a plurality of peripheral devices match the gesture sensed. The following description related to FIGS. 9A, 9B, 9C and 9D will be given under assumption that a function matched with a user gesture 900 is a function of controlling a preset mobile terminal or a function of controlling a preset tablet PC.

First, referring to FIG. 9A, the controller 180 may output graphic objects corresponding to the plurality of peripheral devices one by one on the display unit 151 based on a preset order. For example, when an output order is preset to first output the function of controlling the mobile terminal, followed by the function of controlling the tablet PC, the controller 180 may first output a graphic object 914 corresponding to the function of controlling the mobile terminal on the display unit 151, in response to the user gesture 900. (a) of FIG. 9A illustrates this example.

Graphic objects 910 and 912, which are similar to those illustrated in FIGS. 8A and 8B, may further be output around the graphic object 914. That is, the controller 180 may further output on the display unit 151 a graphic object 910 in a shape of a button for selecting a function corresponding to the currently-output graphic object 914, or a graphic object 912 in a shape of a button for outputting a graphic object corresponding to another function, namely, a function of controlling another peripheral device.

The controller 180 may sense a user selection with respect to one of the graphic objects 910 and 912. For example, when a user gesture (e.g., a gesture pressing a specific button) with respect to one of the graphic objects 910 and 912 is sensed, the controller 180 may determine that the one graphic object has been selected.

For example, when the user gesture is sensed on the graphic object 912, the controller 180, as illustrated in (b) of FIG. 9A, may determine that the user has selected an output of the graphic object corresponding to the function of controlling another peripheral device. Accordingly, the controller 180 may output a graphic object 916 corresponding to a function preset to be output in the next order, namely, the function of controlling the tablet PC, on the display unit 151. Here, the graphic objects 914 and 916 may be output around an area on the display unit 151, through which the user's body portion (e.g., the user's hand) associated with the user gesture 900 is transmitted.

As illustrated in (b) of FIG. 9A, the controller 180 may further output the graphic object 910 for selecting the currently-output function, or the graphic object 912 for outputting another function, namely, a graphic object corresponding to the another function, near the graphic object 916 corresponding to the function of controlling the tablet PC.

Figure 9B:
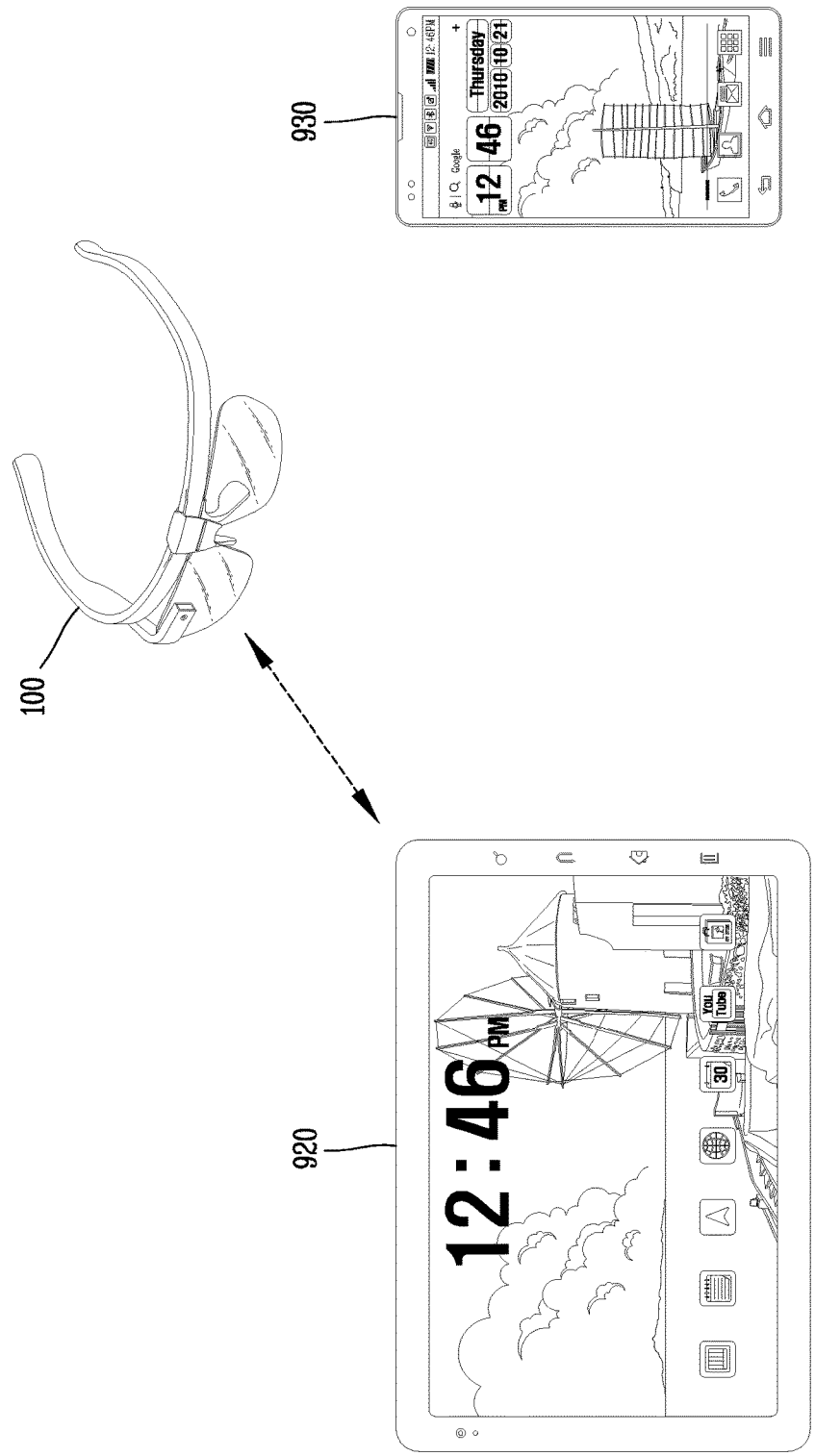

In this state, when the user gesture is sensed on the graphic object 910 for selecting the currently-output function, the controller 180 may determine that the user has selected the control of the tablet PC. In this instance, as illustrated in FIG. 9B, the controller 180 may connect the glass-type terminal 100 with the tablet PC 920 through wireless communication or the like, and output screen information corresponding to the function of controlling the tablet PC on the display unit 151. The controller 180 may sense an additional gesture of the user and control the currently-connected peripheral device, namely, the table PC 930, in response to the sensed gesture.

Meanwhile, FIGS. 9A and 9B exemplarily illustrate the example of outputting the graphic objects corresponding to the plurality of peripheral devices one by one based on the preset order, but the graphic objects may alternatively be output in a different manner. For example, the graphic objects corresponding to the plurality of peripheral devices may all be output on the display unit 151, and one of the graphic objects may be selected in response to the user's additional gesture.

FIGS. 9C and 9D illustrate this example.

As illustrated in FIGS. 9C and 9D, the controller 180, as illustrated in (a) of FIG. 9C, may output graphic object 950 and 952 corresponding to the plurality of peripheral devices on the display unit 151. The graphic objects 950 and 952 may be output adjacent to one area on the display unit 151, through which the user's body portion (e.g., the user's hand) associated with the gesture 900 is transmitted.

In this state, the controller 180 may sense whether an additional gesture with respect to one of the graphic objects 950 and 952 is applied by the user. Here, the user's additional gesture, as illustrated in (b) of FIG. 9C, may be a gesture of moving the user's finger to an area corresponding to an output position of the specific graphic object 952, and the like. When the one graphic object 952 is selected through the user's additional gesture, the controller 180 may determine that the control for the peripheral device corresponding to the currently-selected graphic object 952 has been selected by the user.

When a function of controlling one peripheral device is selected by the user, the controller 180 connects the glass-type terminal 100 with the selected peripheral device through wireless communication or the like. And, the controller 180 may output screen information 954 for the control of the currently-connected peripheral device on the display unit 151. (a) and (b) of FIG. 9D illustrate this example.

Here, the screen information 954 may include information related to the currently-connected tablet PC 960. For example, the screen information 954 may include information related to applications or data stored in the currently-connected tablet PC 960, and information related to items for executing functions provided in the tablet PC. When the user makes an additional gesture, the controller 180 may control the tablet PC 960 based on the additional gesture.

For example, the controller 180 may sense the user's additional gesture for selecting a specific item included in the screen information 954. The additional gesture may be a gesture for situating an image corresponding to the user's fingertip on an area corresponding to the specific item included in the screen information 954. In this instance, the controller 180 may control a function corresponding to the selected specific item to be executed on the tablet PC 960, receive an execution result of the function from the table PC 960, and output the received execution result at a predetermined area on the display unit 151. Here, the predetermined area on the display unit 151 may be an output area of the screen information 954.

Therefore, the user can connect the glass-type terminal 100 according to the embodiment disclosed herein with one of a plurality of peripheral devices based on a user selection, and indirectly control the connected peripheral device using the glass-type terminal 100.

Meanwhile, when the one function is selected, the controller 180 may further determine whether or not the selected function is a function which is needed to be associated (linked) with a peripheral device (S704). Here, the function needed to be linked with the peripheral device, for example, may be a function for controlling at least one peripheral device, such as a remote controller function, or a function for using data or applications stored in a specific peripheral device.

When the currently-selected function is a function needed to be linked with the peripheral device according to the determination result of the step S704, the controller 180 may detect whether or not there is the peripheral device which is needed for the association. For example, the controller 180 may search for whether or not there are connectable peripheral devices based on a current position and state of the glass-type terminal 100 when the currently-selected function is the remote controller function. Here, the controller 180 may also search for whether or not the connectable peripheral devices are included in preset peripheral devices.

When the peripheral devices are searched, the controller 180 may connect the glass-type terminal 100 with at least one of the searched peripheral devices based on a user selection through wireless communication or the like (S706). In this instance, in the step S404, screen information related to the currently-connected peripheral device may be output on the display unit 151.

Meanwhile, when the searched peripheral device is in plurality, the controller 180 may output graphic objects corresponding to the searched plurality of peripheral devices on the display unit 151 at once or in a sequential manner, by the similar method to those illustrated in FIGS. 8A, 8B, 8C, 8D, 9A, 9B, 9C and 9D. The controller 180 may determine that at least one graphic object has been selected based on a user selection, for example, the user's additional gesture. When the at least one graphic object is selected, the controller 180 may perform a function linked with the peripheral device corresponding to each selected graphic object.

For example, when the function selected by the user is a mobile phone function, the controller 180 may also receive phonebook information, which is stored in the user's mobile terminal, from the user's mobile terminal, based on a user selection.

When the user selects a mobile phone function and a phonebook function, the controller 180 may output phonebook information stored in the memory 160 of the glass-type terminal 100 on the display unit or receive phonebook information from a preset peripheral device (e.g., the user's mobile terminal) and display the received phonebook information on the display unit 151, on the basis of a user selection.

FIGS. 10A and 10B are views illustrating an example of executing a function linked with a specific peripheral device in a glass-type terminal in accordance with an embodiment of the present invention, under assumption of the aforementioned example.

Referring to FIG. 10A, the controller 180, as illustrated in (a) and (b) of FIG. 10A, may output screen information 1002 related to the mobile phone function, in response to a user gesture (e.g., a gesture like gripping the mobile phone; 1000). The screen information 1002 may include an item 1004 for a function to be linked with a mobile terminal 1010 belonging to the user.

In this instance, the user may select a function to be linked with the mobile terminal 1010 using an additional gesture with respect to the screen information 1002. For example, when the user's fingertip transmitted through the display unit 151 is located on an output area of the linkable item 1004 for more than a preset time, the controller 180 may determine that the linked function has been selected.

Then, the controller 180 may check whether or not the mobile terminal 1010 is in a connectable state. When the mobile terminal 1010 is in the connectable state, the controller 180 may attempt to connect the glass-type terminal 100 with the mobile terminal 1010, as illustrated in (a) of FIG. 10B. When the mobile terminal 1010 is connected, the controller 180 may execute a linked function with the mobile terminal 1010 based on a user selection.

Here, the linked function between the glass-type terminal 100 and the mobile terminal 1010 may be an exchange of phonebook information and the like. In this instance, the controller 180, as illustrated in (b) of FIG. 10A and (a) of FIG. 10B, may receive the phonebook information from the connected mobile terminal 1010, and output the received phonebook information on the display unit 151. (b) of FIG. 10B illustrates this example.

Therefore, the glass-type terminal 100 according to the embodiment disclosed herein may execute a call origination or message transmission by the user' direct input of the phone number or using the phone number prestored in the memory 160 of the glass-type terminal 100. However, the glass-type terminal 100 according to the embodiment disclosed herein may alternatively receive the prestored phonebook information from a preset another device, for example, the user's mobile terminal 1010 and execute the call origination or message transmission using the received phonebook information, on the basis of a user selection.

Meanwhile, the linked function may also be a function associated with a plurality of peripheral devices. In this instance, the controller 180 may also select at least two of the searched peripheral devices in a simultaneous or sequential manner.

For example, the linked function may be a data exchange function between one peripheral device and another peripheral device. In this instance, the controller 180 may connect two or more peripheral devices through wireless communications based on a user selection, and execute a linked function with the plurality of peripheral devices by controlling the two or more peripheral devices.

Figure 11B:
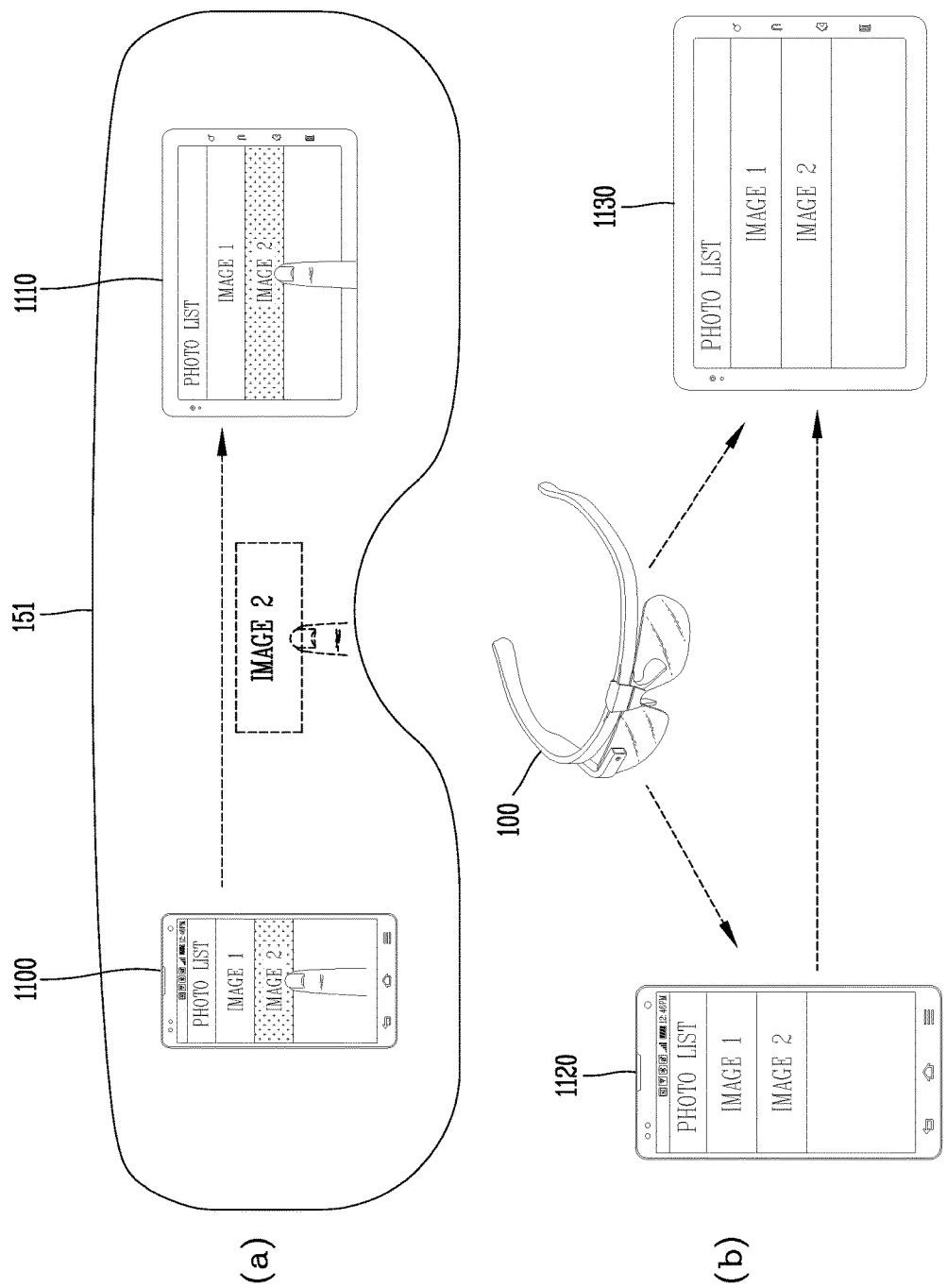

FIGS. 11A and 11B are views illustrating an example of executing a function linked with a plurality of peripheral devices in a glass-type terminal in accordance with an embodiment of the present invention.

For example, the controller 180 may select another function in response to a sensed user gesture even in a state that one function has been selected. That is, the controller 180 may execute a selected specific function when the specific function is selected in response to a primary user gesture, and output corresponding screen information on the display unit 151. In this state, when the user makes a secondary gesture for selecting another function, the controller 180 may execute another function matched with the secondary gesture and output corresponding screen information on the display unit 151.

When the function matched with the primary gesture is a function for controlling the mobile terminal, the controller 180 may connect the glass-type terminal 100 with the mobile terminal and output screen information 1100 related to the mobile terminal on the display unit 151. Here, the screen information 1100 may include a screen associated with the control of the mobile terminal, namely, items corresponding to various functions executable on the currently-connected mobile terminal.

In this state, as illustrated in (a) of FIG. 11A, when the secondary gesture 1102 is sensed, the controller 180 may select and execute a function corresponding to the secondary gesture 1102.

(b) of FIG. 11A illustrates this example.

For example, when the secondary gesture 1102, as illustrated in (a) of FIG. 11A, is a gesture of gripping a mobile phone with both hands, the controller 180 may determine based on gesture information stored in the memory 160 that the secondary gesture 1102 is for a function of controlling the tablet PC. In this instance, the controller 180 may connect the glass-type terminal 100 with the tablet PC. The controller 180 may then, as illustrated in (b) of FIG. 11A, execute the function for controlling the tablet PC and output screen information 1110 related to the execution on the display unit 151.

Here, the screen information 1110 related to the tablet PC may include a screen associated with the control of the tablet PC, namely, items corresponding to various functions executable on the currently-connected tablet PC.

As such, when the screen information 1100 related to the mobile terminal and the screen information 1110 related to the tablet PC are output on the display unit 151, the controller 180 of the glass-type terminal 100 according to the embodiment disclosed herein may control both of the mobile terminal and the tablet PC based on the user gesture applied to each of the screen information 1100 and 1110.

For example, as illustrated in (a) of FIG. 11B, when the user selects specific data (e.g., 'Image 2') on the screen information 1100 related to the mobile terminal, the controller 180 may control the specific data which is really stored in the mobile terminal 1120 to be selected by the user. In this instance, as illustrated in (a) of FIG. 11B, when the user drags the selected data from the screen information 1100 related to the mobile terminal to an arbitrary position on the screen information 1110 related to the tablet PC, the selected data may be really moved or copied from the mobile terminal 1120 to the tablet PC 1130.

This results from, as illustrated in (b) of FIG. 11B, that both of the mobile terminal 1120 and the tablet PC 1130 are connected by the glass-type terminal 100 and the glass-type terminal 100 controls both of the mobile terminal 1120 and the tablet PC 1130, such that the user can transmit selected data from the mobile terminal 1120 to the tablet PC 1130.

As such, the glass-type terminal 100 according to the embodiment disclosed herein can sense the user gesture and execute a specific function that matches the sensed gesture. Here, the specific function includes not only a function capable of being provided by the glass-type terminal 100 itself but also a function of controlling at least one peripheral device. Also, the specific function may be a function of linking the glass-type terminal 100 with at least one peripheral device. Therefore, the user can select and execute functions provided from peripheral devices as well as the functions provided by the glass-type terminal 100, merely by applying a simple gesture, without a separate input device.

Hereinafter, examples of the various functions which are selected and executed by the user gesture will be described in more detail with reference to the accompanying drawings.

FIGS. 12, 13A, 13C, 14A, 14B, 15A, 15B and 15C are views illustrating examples in which a function matched with a user gesture sensed in a glass-type terminal according to an embodiment of the present invention is executed.

First, FIG. 12 assumes an example of selecting and executing a function matched with a user gesture while the user is driving.

As illustrated in (a) of FIG. 12, while the user is driving a vehicle or the user makes a driving gesture, the controller 180 may sense this user gesture, and thus search for a function that matches the sensed user gesture.

For example, for the driving gesture, the matched function may be a navigation function. Also, the function may vary according to a type of the driving gesture. For example, when the user makes a gesture of driving a four-wheel-drive vehicle with a circular handle, as illustrated in (b) of FIG. 12, the driving gesture may match a navigation function outputting navigation information, such as map information, on the display unit 151. On the other hand, when the user makes a gesture of driving a two-wheel-drive vehicle (e.g., a motorcycle or motorbike) with a bar-like handle, the driving gesture may match a navigation function of notifying the navigation information as voice information for safety.

Or, a function corresponding to a driving purpose may also be selected according to a user selection. For example, a function that matches the driving gesture may be a function of connecting the glass-type terminal with an exclusive smart device for a delivery service. In this instance, information related to the exclusive smart device for the delivery service may be output on the display unit 151.

Meanwhile, when the user makes a gesture of gripping a mobile phone or the like with a hand, as illustrated in FIGS. 8A, 8B, 8C and 8D, the controller 180 may determine that the gesture is to select a mobile phone function or a remote controller function.

In this instance, when the user selects the remote controller function, the controller 180 may search for connectable, namely, controllable peripheral devices, and allow the user to select one of the searched peripheral devices.

FIGS. 13A, 13B, 13C and 13D illustrate this example.

First, referring to FIG. 13A, when the user makes a gesture 1220 of gripping a mobile phone or the like with a hand, the controller 180 may display a graphic object 1222 in a shape of a remote controller on an output area of the user's hand. A graphic object 1226 for selecting a function corresponding to the currently-output graphic object 1222 and a graphic object 1128 for selecting another function may further be output adjacent to the graphic object 1222.

Here, the graphic objects 1126 and 1128 may also be utilized for other purposes. For example, the graphic object 1226 for selecting a specific function may be used for the purpose of selecting a specific home appliance to control, and the graphic object 1228 for selecting another function may also be used for the purpose of canceling the control of the currently-selected home appliance.

For example, in a state that the graphic object 1222 in the shape of the remote controller is output, when the user makes a preset gesture (e.g., a gesture of pressing the graphic object 1222) on the output area of the graphic object 1222, the controller 180 may determine that the user has selected the remote controller function as a function that matches the gesture 1220. In this instance, the controller 180 may also output graphic objects associated with currently-connectable peripheral devices on the display unit 151.

Figure 13B:
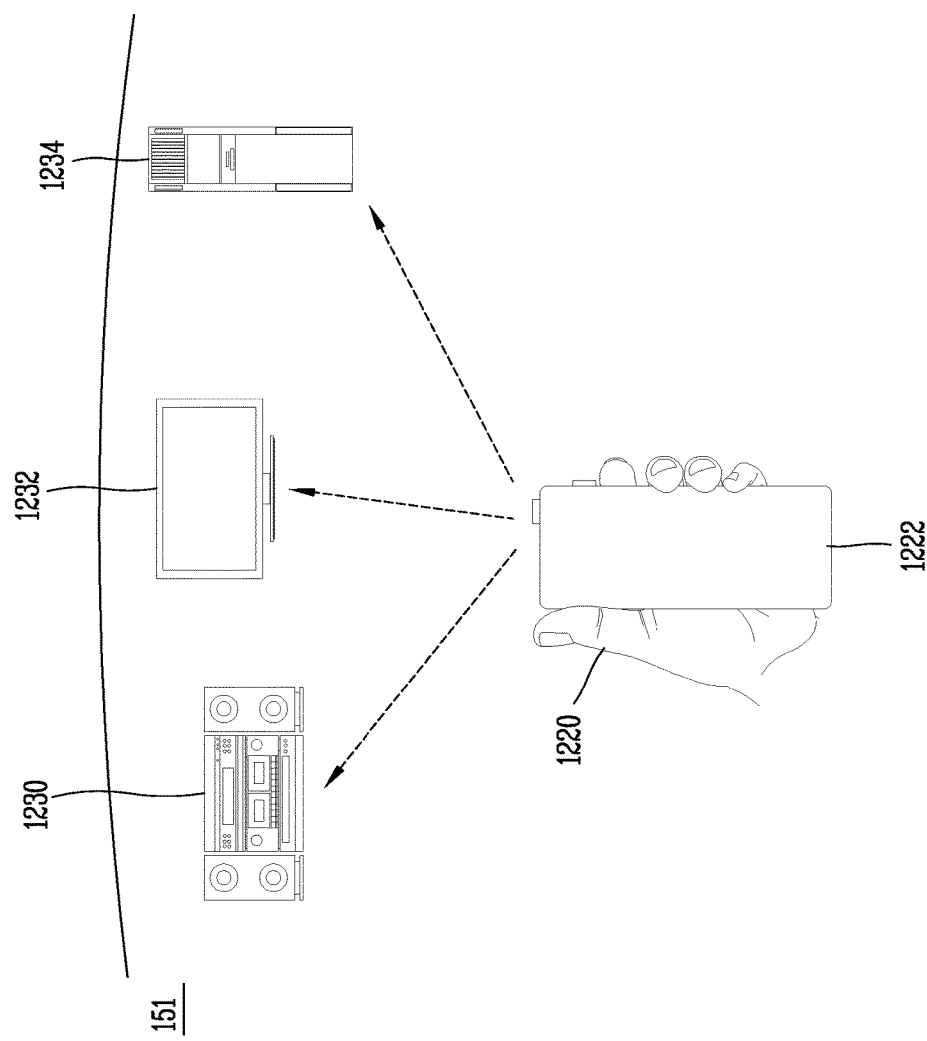

FIG. 13B illustrates this example.

For example, when the currently-connectable peripheral devices are an audio, a television and an air conditioner, the controller 180 may output graphic objects 1230, 1232 and 1234 corresponding to the connectable peripheral devices on the display unit 151.

Figure 13C:
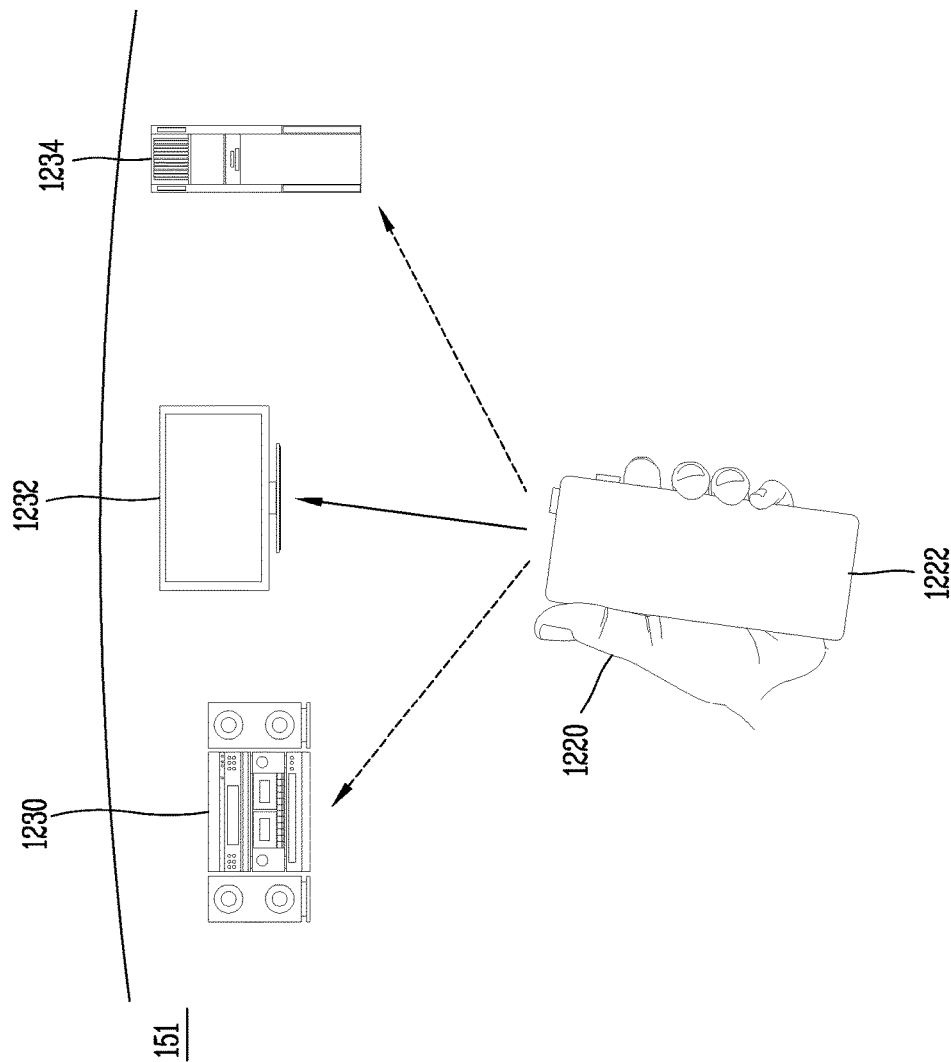

Here, the graphic objects 1230, 1232 and 1234 corresponding to the peripheral devices, respectively, may be displayed in a form of being located in different directions from one another. In this state, one of the connectable peripheral devices may be selected in response to an additional gesture of the user. For example, the controller 180, as illustrated in FIG. 13C, may determine that one graphic object has been selected based on a direction that the graphic object 1222 in the shape of the remote controller faces. Here, the direction that the graphic object 1222 in the shape of the remote controller faces may change according to a direction that the user gesture 1220 faces.

Also, the controller 180, as illustrated in FIG. 13C, may further output on the display unit 151 an auxiliary graphic object 1236 in a shape of an arrow along a direction that the graphic object 1222 in the shape of the remote controller currently faces, in order for the user to select a specific peripheral device more easily.

Meanwhile, the user can select a specific peripheral device by selecting a graphic object corresponding to a desired peripheral device. For example, when the user makes a preset gesture (e.g., a gesture of pressing the graphic object 1222) on an output area of the graphic object 1222, the controller 180 may determine that the user has selected a graphic object corresponding to the current direction of the graphic object 1222 in the shape of the remote controller.

Figure 13D:
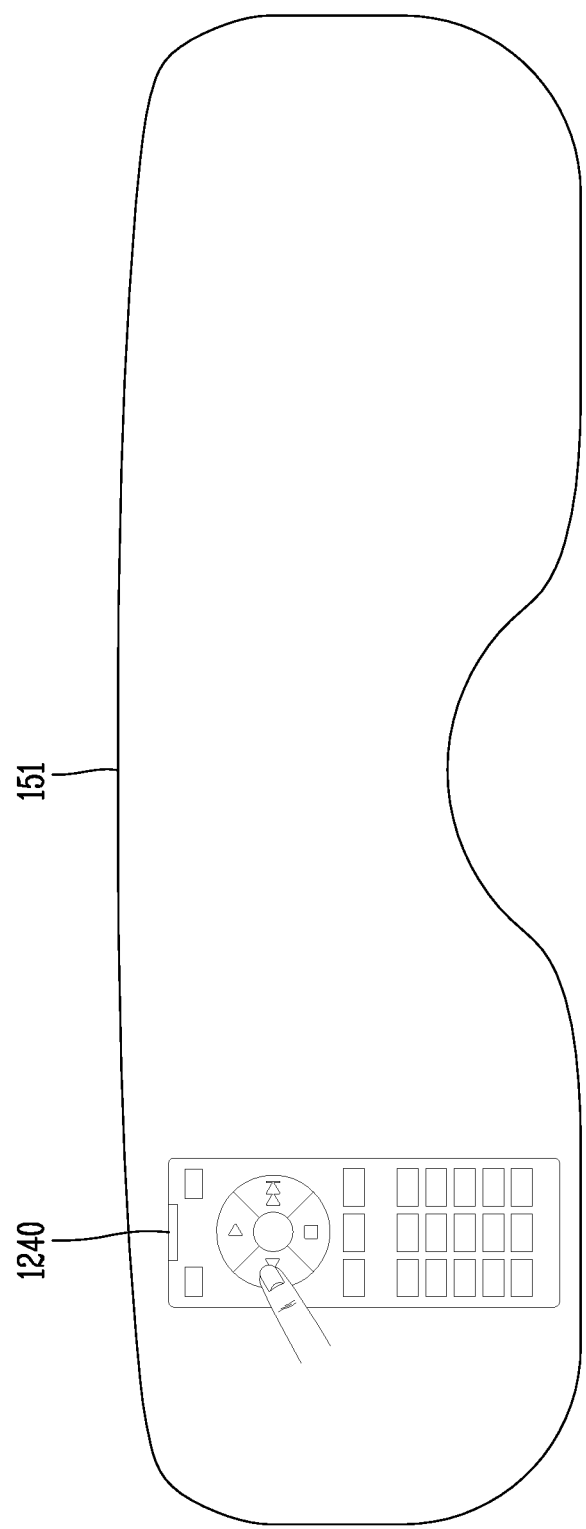

When the selected graphic object corresponds to the television, the controller 180 may perform a connection with the television through wireless communication or the like. Screen information 1240 having the shape of the remote controller for controlling the currently-connected peripheral device, namely, the television, may also be output on the display unit 151. FIG. 13D illustrates this example.

Therefore, as illustrated in FIG. 13D, the screen information 1240 may include items of functions of the currently-selected peripheral device, namely, the television. When the user's fingertip transmitted through the display unit 151 is located on an output area of one item for more than a preset time, the controller 180 may determine that the one item has been selected. The controller 180 may transmit a control signal to the television based on the item that is determined as having selected by the user. The operation of the television may be controlled according to the received control signal.

Meanwhile, FIGS. 13A, 13B, 13C and 13D have been described under assumption that the user makes a specific gesture and selects one of various peripheral devices by changing a direction that the gesture is made. However, the present invention may not be limited to the method of selecting one of the peripheral devices.

For example, as illustrated in FIGS. 8A, 8B and 9A, the controller 180 may sequentially output connectable peripheral devices, for example, graphic objects in a shape of a remote controller, and control one of the graphic objects to be selected based on a user selection. Or, when the user selects a remote controller function as a function matched with a user gesture, the connectable peripheral devices may be output on the display unit 151 in the form of a list and one of the peripheral devices may be selected.

Also, the connectable peripheral devices may be peripheral devices preset by the user, or peripheral devices searched by the controller 180 around the glass-type terminal 100 according to the embodiment disclosed herein, on the basis of a user request.

Meanwhile, the controller 180 of the glass-type terminal 100 according to the embodiment disclosed herein may sense a user gesture and use the sensed user gesture in various manners. For example, the controller 180 may sense a user gesture, determine what motion the user is currently making, and execute an appropriate application based on the determined user's operation.

For example, when the user plays a musical instrument, the controller 180 may sense a motion of the user's hands or fingers playing the musical instrument, to recognize a kind of the musical instrument that the user is playing. The controller 180 may provide the user with a function corresponding to the kind of the musical instrument that the user is playing.

Figure 14B:
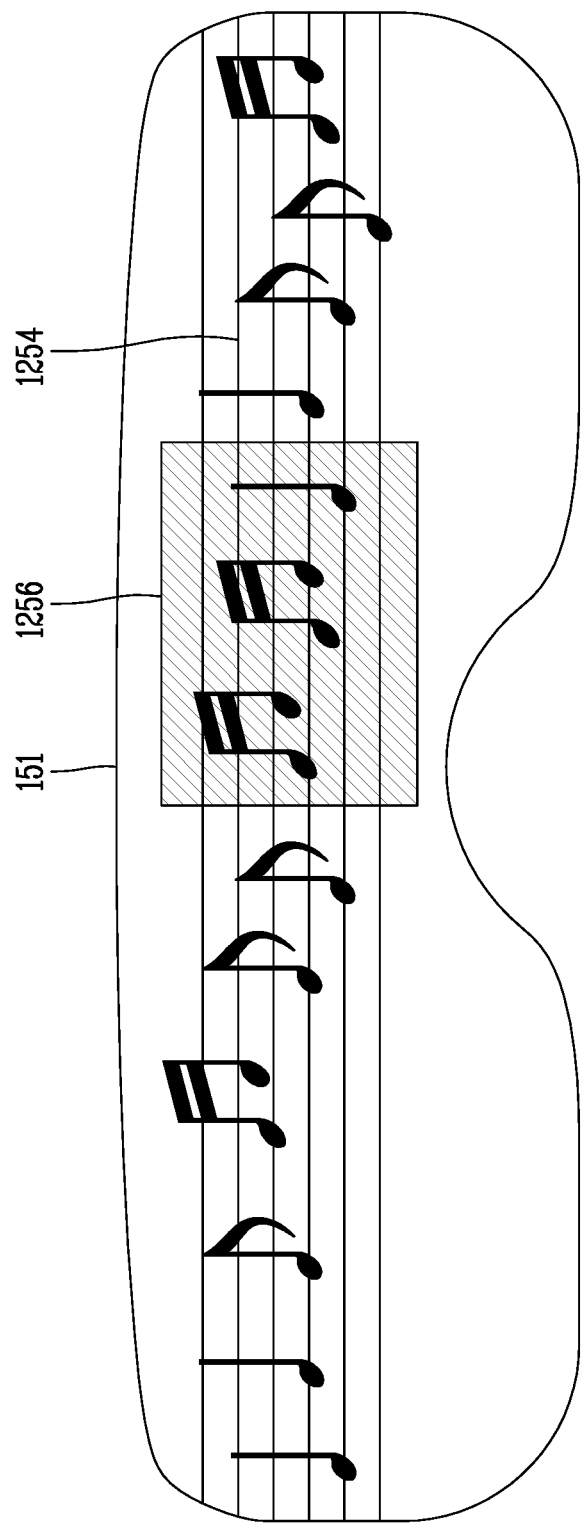

FIGS. 14A and 14B illustrate these examples.

For example, when the user plays a musical instrument or makes a gesture like playing the musical instrument, the controller 180, as illustrated in (a) of FIG. 14A, may sense a user gesture 1250 through a preset recognition area.

In this state, the controller 180 may search for a function that matches the user gesture. Here, the matched function may differ according to a musical instrument that the user is playing or a musical instrument corresponding to the playing gesture. For example, as illustrated in (a) of FIG. 14A, when the user makes a gesture 1250 of moving (or folding) fingers with both hands open, the controller 180 may determine that the user gesture is for playing piano.'

Or, as illustrated in (b) of FIG. 14A, when the user plays a piano 1252, the controller 180 may sense the motion 1250 of the user who plays the piano, and determine that the user is making an action of playing the piano.

In this instance, the controller 180, as illustrated in (a) or (b) of FIG. 14A, may select a function associated with the performance of the piano as a function that matches the user gesture 1250. For example, the controller 180 may select a function of outputting a piano score as the function associated with the performance of the piano.

The function may be a function of executing an application stored in the memory 160 of the glass-type terminal 100. Or, the function may be to execute an application stored in another peripheral device, namely, the user's mobile terminal, which is linked with the glass-type terminal 100. In this instance, the controller 180 may receive information related to the execution of the application through a connection with a preset another peripheral device and execute the application on the glass-type terminal 100, or control the application to be executed on the peripheral device by a remote control and receive only the execution result in the glass-type terminal 100.

Meanwhile, as aforementioned, when the function associated with the piano score is executed, the controller 180 may sense the user's performance or the user gesture and output a part of the score, which the user is currently playing, in a manner of being different from the other portion of the score.

FIG. 14B illustrates this example.

For example, when the user plays a musical instrument, the controller 180 may sense the played sound of the instrument, and output a portion 1256 of the score 1254 corresponding to a currently-played portion on the display unit 151 in a highlighting manner. Or, the controller 180 may sense a user gesture of playing the musical instrument and output the portion 1256 of the score 1254 corresponding to the user gesture in the highlighting manner. Or, the controller 180 may output a specific portion of the score in the highlighting manner, based on a lapse of time, starting from a time point that the user starts to play the musical instrument.

Also, when the user really plays the piano, the controller 180 may not only output the played score by indicating a currently-played portion of the score to the user, but also sense a music played by the user to determine whether or not the user plays the piano wrong. For example, when a scale of a chord played by the user is wrong, it may be indicated on the score output on the display unit 151 such that the user can recognize the wrong chord.

Also, FIGS. 14A and 14B have been described based on the function of sensing a user gesture, determining for which musical instrument the user gesture is, and providing a score corresponding to the determined musical instrument according to the determination result. However, different functions from this may alternatively be provided.

For example, as illustrated in (a) of FIG. 14A, when the user makes a gesture like playing the piano, the controller 180 may sense it, and determine that the sensed gesture is associated with the piano. In this instance, the controller 180 may also output a musical instrument corresponding to the user gesture, namely, a graphic object in a shape of a piano having a plurality of keys, around an area on the display unit 151 through which the user's hands are transmitted.

In this instance, when the user makes a gesture pressing the keys on the graphic object in the shape of the piano output through the display unit 151, the controller 180 may sense the keys selected by the user using the user's fingertips transmitted on the display unit 151.

The controller 180 may generate a sound corresponding to a key selected by the user gesture. For example, when the user makes a gesture of pressing a plurality of keys corresponding to a specific chord, the controller 180 may generate information related to the specific chord using sound information corresponding to the plurality of keys. The controller 180 may output the specific chord through the audio output module 153.

Therefore, the user can virtually play a musical instrument which is decided according to a user gesture even when there is no musical instrument. This may allow the user to virtually play music while directly listening to the music played by himself/herself.

Meanwhile, FIGS. 14A and 14B have been described based on the example in which the function matched with the user gesture is the piano-related function, but the present invention may not be limited to this. For example, when the user makes a gesture of playing the guitar or actually plays the guitar, the controller 180 may sense the gesture, search for a function associated with the guitar as the function matched with the user gesture, and provide the searched function to the user.

Meanwhile, the controller 180 of the glass-type terminal 100 according to the embodiment of the present invention can also use more various types of information as well as the operation that the user plays a musical instrument. For example, the controller 180 can provide more various functions to the user by using information related to surroundings recognized as well as user gestures which can be sensed in everyday life.

That is, the controller 180 may control a matched function to be searched and executed based on a user's surrounding environment and a user gesture. For example, when the user is running, the controller 180 may determine whether or not the user is currently running on the basis of at least one of a surrounding environment sensed within a preset recognition area of the display unit 151, a sensing value of an acceleration value, a sensed user gesture and the like. In this state, the controller may output information related to the user's current body condition on the display unit 151.

For example, the controller 180 may output the user's heart rate or respiratory rate on a preset area of the display unit 151. The controller 180 may also sense the user's current location, and output navigation information corresponding to the sensed location on the display unit 151.

After the user enters a specific region, when the user makes a specific gesture, the controller 180 may search for a function that matches the gesture and execute the function. For example, in case where the user visits a conference hall or a dinner party, when a gesture that the user shakes hands with another party is sensed, the controller 180 may also execute a function of receiving specific information from the another party who shakes hands with the user.

FIG. 15A illustrates this example.

For example, when the user enters a specific region, such as the conference hall or the dinner party, the controller 180 may sense the entrance of the user into the specific region. For example, the user may preset this specific region. Or, the controller 180 may also receive information related to the specific region from a location information providing device that is installed at the specific region.

When the user enters the specific region, the controller 180 may start to sense a gesture according to a user selection. When any function matches the user-entered specific region and the sensed user gesture, the controller 180 may execute the matched function.

For example, when a gesture of shaking hands is sensed, as illustrated in (a) of FIG. 15A, the controller 180 may execute a function of receiving electronic business card information from another patty with which the user shakes hands.

In this instance, the controller 180 may search for peripheral devices located adjacent to the glass-type terminal 100, namely, peripheral devices that can provide the electronic business card information. Here, the peripheral devices providing the electronic business card information may be mobile terminals located adjacent to the glass-type terminal 100. Also, when a transmission request for the electronic business card information is received from the exterior, the peripheral devices may decide whether or not to transmit the electronic business card information according to a preset state.

Meanwhile, the glass-type terminal 100 according to the embodiment of the present invention may receive the electronic business card information from the peripheral devices. For example, the controller 180 of the glass-type terminal 100 may also preferentially receive the electronic business card information from the most adjacent peripheral device. On the other hand, the controller 180 may also preferentially receive the electronic business card information from a peripheral device that is located in a specific direction.

For example, the glass-type terminal 100 according to the embodiment disclosed herein may sense mobile terminals located within a preset area near the glass-type terminal 100 itself. The controller 180 may also sense directions in which the mobile terminals are located. For example, the controller 180 may sense strengths of specific signals transmitted from the mobile terminals, and detect directions in which the mobile terminals are located, respectively, according to the strengths of the signals.

Here, the controller 180 of the glass-type terminal 100 according to the embodiment of the present invention may receive the electronic business card information only from at least one mobile terminal which is located in a direction that the user faces with eyes.

For example, as illustrated in (b) of FIG. 15A, when the user sees another party 1272 with which the user shakes hands after making a handshaking gesture, the controller 180 may select at least one mobile terminal, which is located in a direction that the user's eyes, namely, the display unit 151 faces, among the mobile terminals, and request for transmission of the electronic business card information from the selected mobile terminal.

Figure 15B:
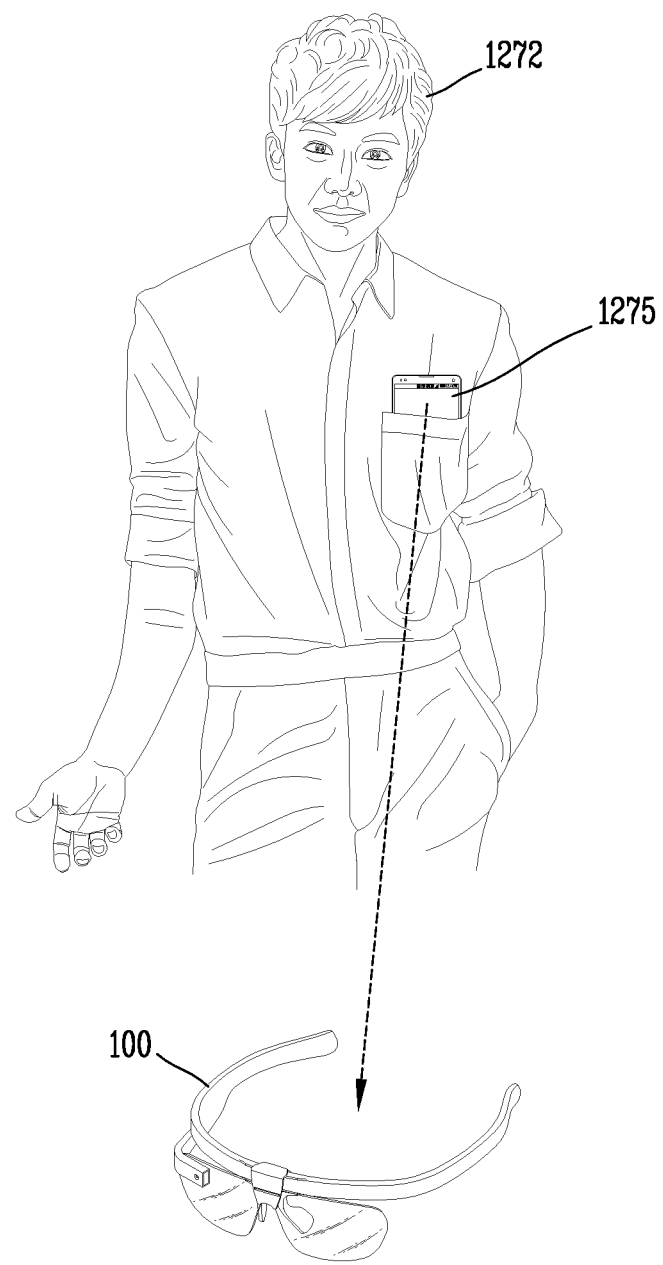

In this instance, the mobile terminal 1275 of the another party 1272 which is located in a direction that the user faces may permit or refuse the transmission request for the electronic business card information according to a preset state. If the state of the mobile terminal 1275 is a state of permitting the transmission of the electronic business card information, as illustrated in FIG. 15B, the electronic business card information stored in the mobile terminal 1275 may be transmitted to the glass-type terminal 100.

The received electronic business card information may be added to phonebook information of the glass-type terminal 100. When the mobile phone function is executed as illustrated in FIG. 6 according to the user gesture, a phonebook including phone number information related to the another party 1272 may be output on the display unit 151.

Figure 15C:
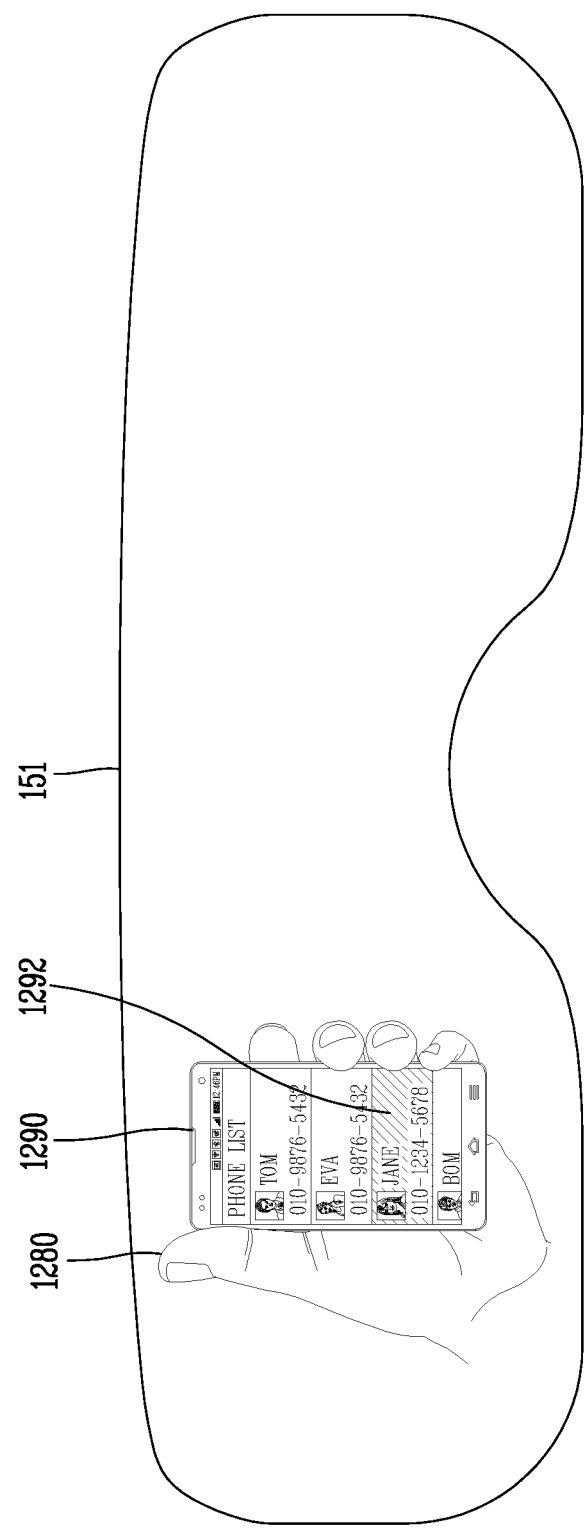

FIG. 15C illustrates this example.

Meanwhile, the foregoing description has been given merely of receiving the electronic business card information, but the glass-type terminal 100 according to the embodiment of the present invention may also input an image of another party, with which the user shakes hands, into the phonebook according to the user selection.

For example, prior to requesting for the transmission of the electronic business card information from a specific mobile terminal, the controller 180 may capture an image transmitted onto the display unit 151. That is, as illustrated in (b) of FIG. 15A, when the user looks at the another party 1272 with which the user is shaking hands, the controller 180 may capture an image of the another party 1272 sensed within a preset recognition area of the display unit 151, and store the captured image together with the received electronic business card information.

Also, FIGS. 15A, 15B and 15C have been described under assumption that the peripheral device providing the electronic business card information is the mobile terminal, but the device providing the electronic business card information may not be limited to the mobile terminal. That is, for example, a tablet PC or other devices can provide the electronic business card information, and in this instance, the glass-type terminal 100 according to the embodiment of the present invention can receive the electronic business card information from the other devices.

Meanwhile, as illustrated in FIGS. 11A and 11B, the glass-type terminal 100 according to the embodiment of the present invention may execute a specific function matched with a user gesture by sensing the user gesture, and also execute another function based on another gesture while one function is executed.

When the user makes a gesture for selecting another function without terminating a currently-executed function, as illustrated in FIGS. 11A and 11B, the controller 180 may execute the another function while the currently-executed function is continued. On the other hand, the user may execute a function matched with a user gesture only while the user gesture is sensed, and output screen information related to the execution on the display unit 151. In this instance, the user may also execute another function without stopping the currently-executed function, by using a preset specific gesture.

FIGS. 16A and 16B are views illustrating an example of executing at least one another function with maintaining a currently-executed function, in response to a user gesture, in a glass-type terminal according to an embodiment of the present invention.

First, as illustrated in (a) of FIG. 16A, in a state that a mobile phone function matched with a user's primary gesture 1300 is executed, the user may make a gesture for maintaining the currently-executed function, namely, the mobile phone function.

For example, the gesture for maintaining the currently-executed function, as illustrated in (b) of FIG. 16A, may be a gesture of changing a direction that a palm faces, such that an image of a back of a user's hand is transmitted on the display unit 151. In this instance, the controller 180 may sense a gesture 1320 for transmitting the image of the back of the user's hand onto the display unit 151, and determine that the user has selected the maintenance of the currently-executed mobile phone function, irrespective of whether or not a user gesture is sensed. Accordingly, screen information 1310 related to the mobile phone function may continuously be output on the display unit 151, irrespective of whether or not the user continuously makes a current gesture, namely, a gesture like gripping the mobile phone.

Accordingly, even without the primary gesture 1300, as illustrated in (a) of FIG. 16B, the controller 180 may maintain the output state of the screen information 1310 related to the mobile phone function on the display unit 151. And, when the user makes a secondary gesture 1350 for selecting another function, for example, a tablet PC function, the controller 180, as illustrated in (b) of FIG. 16B, may execute a function corresponding to the secondary gesture 1350, namely, the tablet PC function, and output screen information 1360 related to the tablet PC function on the display unit 151.

Therefore, even when a function matched with a user gesture is executed only while the user gesture is sensed and screen information related to the execution is output on the display unit 151, the currently-executed function may also be maintained using a preset specific gesture. Also, FIGS. 16A and 16B have been illustrated based on the state that only one function is maintained, but the user can also maintain executed states of a plurality of functions using the specific gesture, regardless of whether or not a gesture is maintained.

Meanwhile, the controller 180 may also decide a size of screen information output on the display unit 151 based on distance information between a user's body portion associated with a sensed gesture and the glass-type terminal 100.

FIG. 17 is a view illustrating an example of changing a size of screen information based on distance information up to a user's body portion associated with a gesture in a glass-type terminal in accordance with an embodiment of the present invention.

The controller 180 of the glass-type terminal 100 according to the embodiment of the present invention may sense distance information up to a user's body portion, namely, a user's hand 1400 which is associated with a sensed user gesture, using a laser sensor and the like, when the user gesture is sensed. The controller 180 may decide the size of screen information 1410 related to a function that matches the sensed gesture on the basis of the sensed distance information. (a) of FIG. 17 illustrates the example.

However, if the distance information up to the user's hand 1400 changes, the controller 180 may change the size of the screen information 1410 based on the changed distance information. For example, when the user's hand 1400 is located closer to the glass-type terminal 100, namely, when the user's hand 1400 is located at a relatively closer distance than the distance illustrated in (a) of FIG. 14A, the screen information 1410 may increase more in size. (b) of FIG. 17 illustrates the example.

Therefore, the user can output screen information in a desired size on the display unit 151 by adjusting a distance between the user's body portion associated with a gesture and the glass-type terminal 100 according to necessity.

Also, the present invention can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet).

Meanwhile, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A head mounted display device, comprising:
a communication unit;
a display unit configured to output an image;
a sensing unit configured to sense a first gesture input based on an image acquired through a camera; and
a controller configured to:
recognize a first external terminal corresponding to the first gesture input,
execute a first function associated with the first gesture input while the first gesture input is sensed,
sense, via the sensing unit, a second gesture input while the first function is being executed,
maintain the execution of the first function while the first gesture input and second gesture input are no longer sensed,
sense, via the sensing unit, a third gesture input;
recognize a second external terminal corresponding to the third gesture input and connect the second external terminal to the head mounted display device through the communication unit; and
in response to sensing the third gesture input, execute a second function related to the second external terminal together with the first function while the third gesture is sensed.

2. The head mounted display device of claim 1, wherein the first function and the second function correspond to at least one application, respectively.

3. The head mounted display device of claim 1, wherein the controller outputs information corresponding to each of a plurality of functions on the display unit when the plurality of functions match the first gesture input, and executes a function selected by a user selection among those information.

4. The head mounted display device of claim 3, wherein the controller outputs those information near one area of the display unit, through which a user's body portion is transmitted.

5. The head mounted display device of claim 1, wherein the controller outputs first screen information corresponding to a plurality of peripheral devices on the display unit when the function matched with the first gesture input is a function associated with the plurality of peripheral devices, and wherein the plurality of peripheral devices are located in different directions from one another on the first screen information.

6. The head mounted display device of claim 5, wherein the controller, when the first screen information is output, connects with at least one of the plurality of peripheral devices to enable communication therewith and output second screen information related to the connected peripheral device on the display unit, in response to an additional gesture, and
wherein the controller controls an operation of the connected peripheral device, in response to a user gesture additionally recognized with respect to the second screen information.

7. The head mounted display device of claim 1, further comprising a memory configured to store information related to the first function of the first external terminal matched with the first gesture input,
wherein the controller extracts the matched function and the information related to the first function of the first external terminal from the memory when the first gesture input is sensed.

8. A method for controlling a head mounted display device provided with a display unit to output an image, the method comprising:
sensing, via a sensing unit, a first gesture input based on an image acquired through a camera;
recognizing, via a controller, a first external terminal corresponding to the first gesture input;
executing, via the controller, a first function associated with the first gesture input while the first gesture input is sensed;
sensing, via the sensing unit, a second gesture input while the first function is being executed;
maintaining, via the controller, the execution of the first function while the first gesture input and second gesture input are no longer sensed;
sensing, via the sensing unit, a third gesture input;
recognizing a second external terminal corresponding to the third gesture input and connecting the second external terminal to the head mounted display device through wireless communication; and
in response to sensing the third gesture input, executing, via the controller, a second function related to the second external terminal together with the first function while the third gesture is sensed.

9. The method of claim 8, wherein the first function and the second function correspond to an execution of at least one application, respectively.

\* \* \* \* \*